(12) United States Patent
Takeuchi

(10) Patent No.: US 8,355,047 B2
(45) Date of Patent: Jan. 15, 2013

(54) TRACKING DEVICE, FOCUS ADJUSTMENT DEVICE, IMAGE-CAPTURING DEVICE, AND TRACKING METHOD

(75) Inventor: Hiroshi Takeuchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 1170 days.

(21) Appl. No.: 12/216,300

(22) Filed: Jul. 2, 2008

(65) Prior Publication Data

US 2009/0009606 A1 Jan. 8, 2009

(30) Foreign Application Priority Data

Jul. 6, 2007 (JP) ................................. 2007-178186

(51) Int. Cl.
*H04N 5/225* (2006.01)
(52) U.S. Cl. .......................... 348/169; 348/345; 382/103
(58) Field of Classification Search .................. 348/169, 348/345; 382/103
See application file for complete search history.

(56) References Cited

U.S. PATENT DOCUMENTS

| | | | | |
|---|---|---|---|---|
| 5,418,595 A * | 5/1995 | Iwasaki et al. | ................... | 396/95 |
| 5,937,216 A * | 8/1999 | Homma et al. | ................... | 396/95 |
| 6,240,253 B1 * | 5/2001 | Yamaguchi et al. | ............ | 396/61 |
| 6,885,819 B2 * | 4/2005 | Shinohara | ..................... | 348/345 |
| 7,079,188 B2 * | 7/2006 | Shiraishi et al. | ............... | 348/350 |
| 7,446,810 B2 * | 11/2008 | Ono | ............................... | 348/345 |
| 7,548,269 B2 * | 6/2009 | Yata | .............................. | 348/352 |
| 2005/0264679 A1 * | 12/2005 | Sasaki et al. | .................. | 348/345 |
| 2007/0263904 A1 * | 11/2007 | Muramatsu | .................. | 382/107 |

FOREIGN PATENT DOCUMENTS

| | | |
|---|---|---|
| JP | B2-5-60712 | 9/1993 |
| JP | A-09-318865 | 12/1997 |
| JP | A-2006-058431 | 3/2006 |
| JP | A-2007-017787 | 1/2007 |
| JP | A-2008-9053 | 1/2008 |

* cited by examiner

*Primary Examiner* — Philip B Tran
(74) *Attorney, Agent, or Firm* — Oliff & Berridge, PLC

(57) ABSTRACT

A tracking device includes: a first tracking control unit that tracks an object based upon focus adjustment states that are detected by a focus detection unit in a plurality of focus detection positions; a second tracking control unit that tracks the object based upon image information that is outputted by an image-capturing unit and reference image information that has been set as a reference; a setting unit that sets a degree to which focus adjustment based upon a focus adjustment state detected by the focus detection unit is temporarily prohibited; and a control unit that selects one of the first tracking control unit and the second tracking control unit to be used for tracking the object, based upon the degree that has been set by the setting unit.

25 Claims, 16 Drawing Sheets

TRACKING DEVICE, FOCUS ADJUSTMENT DEVICE, IMAGE-CAPTURING DEVICE, AND TRACKING METHOD

INCORPORATION BY REFERENCE

The disclosure of the following priority application is herein incorporated by reference:

Japanese Patent Application No. 2007-178186, filed Jul. 6, 2007.

BACKGROUND OF THE INVENTION

1. Field of the Invention

The present invention relates to a tracking device, a focus adjustment device, an image-capturing device, and a tracking method.

2. Description of Related Art

An image tracking device is per se known that not only tracks a photographic subject in a photographic scene, according to a characteristic of the subject within a tracking field such as its color or luminance or the like, but also shifts the focus detection position in the scene at which the focus adjustment state of the photographic lens is detected, to the position of the subject to be tracked (for example, refer to Japanese Patent Publication H05-060712).

With this device, if the tracking field of view leaves a predetermined region in the scene, then driving of the photographic lens is temporarily prohibited at this time point.

SUMMARY OF THE INVENTION

However, with the image tracking device described above, there has been the problem that, if it is contemplated to apply a technique for selecting the focus detection position based upon the result of detection of the focus of the photographic lens, then it is not possible to use various different selection references in an appropriate manner.

According to the 1st aspect of the present invention, a tracking device that tracks an object in an image field of an optical system, comprises: a focus detection unit that repeatedly detects focus adjustment states of the optical system at a plurality of focus detection positions that are set within the image field of the optical system; a first tracking control unit that tracks the object based upon the focus adjustment states that are detected by the focus detection unit in the plurality of focus detection positions; an image-capturing unit that repeatedly captures an image formed by the optical system and outputs image information corresponding thereto; a second tracking control unit that tracks the object based upon the image information that is outputted by the image-capturing unit, and reference image information that has been set as a reference; a setting unit that sets a degree to which focus adjustment based upon a focus adjustment state detected by the focus detection unit is temporarily prohibited; and a control unit that selects one of the first tracking control unit and the second tracking control unit to be used for tracking the object, based upon the degree that has been set by the setting unit.

According to the 2nd aspect of the present invention, in the tracking device according to the 1st aspect, it is preferred that the control unit prohibits focus adjustment while the tracking is being performed by one of the first tracking control unit and the second tracking control unit that has been selected based upon the degree.

According to the 3rd aspect of the present invention, in the tracking device according to the 1st aspect, it is preferred that: the setting unit is capable of setting a plurality of degrees; the relatively stronger degree among the plurality of degrees has been set by the setting unit, the control unit gives more priority to the second tracking control unit to be selected; and the control unit prohibits focus adjustment while the tracking is being performed by the second tracking control unit.

According to the 4th aspect of the present invention, in the tracking device according to the 3rd aspect, it is preferred that the degree to which focus adjustment is prohibited is set according to a length of a time period over which the focus adjustment is prohibited, and the stronger is the degree to which the focus adjustment is prohibited, the longer is the time period over which the focus adjustment is prohibited.

According to the 5th aspect of the present invention, in the tracking device according to the 1st aspect, it is preferred that: the tracking device further comprises a reference image update unit that updates the reference image information based upon the image information that is repeatedly outputted; and the control unit lowers a frequency of updating of the reference image information by the reference image update unit when the second tracking control unit has been selected, as compared with when the first tracking control unit has been selected.

According to the 6th aspect of the present invention, in the tracking device according to the 1st aspect, it is preferred that: the tracking device further comprises a focus adjustment unit that is capable of repeatedly performing focus adjustment of the optical system, and also temporarily prohibiting the focus adjustment; and the focus adjustment unit prohibits the focus adjustment, when the second tracking control unit is selected, and a degree of resemblance between the image information and the reference image information is less than or equal to a predetermined value.

According to the 7th aspect of the present invention, in the tracking device according to the 1st aspect, it is preferred that: the tracking device further comprises a focus adjustment unit that is capable of repeatedly performing focus adjustment of the optical system, and also temporarily prohibiting the focus adjustment; and the focus adjustment unit prohibits the focus adjustment, when the second tracking control unit is selected, and the second tracking control unit has become impossible to track the object.

According to the 8th aspect of the present invention, in the tracking device according to the 1st aspect, it is preferred that the setting unit sets the degree of prohibition according to a degree of change of image information that corresponds to a focus detection position that has been selected.

According to the 9th aspect of the present invention, an image-capturing device comprises a tracking device according to the 1st aspect of the present invention.

According to the 10th aspect of the present invention, a tracking device that tracks an object in an image field of an optical system, comprises: a focus detection unit that repeatedly detects focus adjustment states of the optical system at a plurality of focus detection positions that are set within the image field of the optical system; an image-capturing unit that repeatedly captures an image formed by the optical system and outputs image information corresponding thereto; a tracking control unit that tracks the object based upon the image information that is outputted by the image-capturing unit, and reference image information that has been set as a reference; a reference image update unit that updates the reference image information based upon the image information that is repeatedly outputted; a setting unit that sets a degree to which focus adjustment based upon a focus adjustment state detected by the focus detection unit is temporarily prohibited; and a control unit that controls a frequency of updating of the reference image information by the reference image update unit, based upon the degree that has been set by the setting unit.

According to the 11th aspect of the present invention, a focus adjustment device comprises: a focus detection unit that repeatedly detects focus adjustment states of an optical system at a plurality of focus detection positions that are set within an image field of the optical system; a first selection unit that selects any one of the plurality of focus detection positions, based upon the focus adjustment states; an image-capturing unit that repeatedly captures an image formed by the optical system and outputs image information corresponding thereto; a second selection unit that selects any one of the plurality of focus detection positions, based upon the image information and reference image information that has been set as a reference; a focus adjustment unit that repeatedly performs focus adjustment of the optical system based upon a focus adjustment state that is repeatedly detected for a focus detection position that has been selected by either the first selection unit or the second selection unit, and also is capable of temporarily prohibiting the focus adjustment; a setting unit that sets a degree to which the focus adjustment based upon a focus adjustment state detected by the focus detection unit is temporarily prohibited; and a control unit that, when a focus position that is made a subject of the focus adjustment by the focus adjustment unit is selected, selects one of the first selection unit and the selection unit based upon the degree set by the setting unit.

According to the 12th aspect of the present invention, in the focus adjustment device according to the 11th aspect, it is preferred that: the focus adjustment unit prohibits the focus adjustment based upon either change of the focus adjustment state detected at the focus detection position that has been selected by the first selection unit, or fluctuation of the focus detection position selected by the first selection unit or the second selection unit; the setting unit is capable of setting a first degree of prohibition and a second degree of prohibition that have different sensitivities, with respect to at least one of the change of the focus adjustment state, and the fluctuation of the focus detection position; and the control unit gives priority to the first selection unit to be selected over the second selection unit, if the first degree of prohibition is set, and gives priority to the second selection unit to be selected over the first selection unit, if the second degree of prohibition is set.

According to the 13th aspect of the present invention, in the focus adjustment device according to the 11th aspect, it is preferred that: the focus adjustment device further comprises a reference image update unit that updates the reference image information based upon the image information that is repeatedly outputted; and the control unit lowers a frequency of updating of the reference image information by the reference image update unit when giving priority to the second selection unit is to be selected over the first selection unit, as compared with when giving priority to the first selection unit to be selected over the second selection unit.

According to the 14th aspect of the present invention, in the focus adjustment device according to the 11th aspect, it is preferred that the focus adjustment unit prohibits the focus adjustment, when the control unit gives priority to the second selection unit to be selected over the first selection unit, and a degree of resemblance between the image information and the reference image information is less than or equal to a predetermined value.

According to the 15th aspect of the present invention, in the focus adjustment device according to the 11th aspect, it is preferred that the focus adjustment unit prohibits the focus adjustment, when the control unit gives priority to the second selection unit to be selected over the first selection unit, and the focus detection position cannot be selected by the second selection unit.

According to the 16th aspect of the present invention, in the focus adjustment device according to the 11th aspect, it is preferred that the setting unit sets the degree of prohibition according to the degree of change of the image information corresponding to a focus detection position that has been selected.

According to the 17th aspect of the present invention, an image capturing device comprises a focus adjustment device according to the 11th aspect of the present invention.

According to the 18th aspect of the present invention, a tracking method for tracking an object in an image field of an optical system, comprises: repeatedly detecting focus adjustment states of an optical system at a plurality of focus detection positions that are set within the image field of the optical system; repeatedly capturing an image formed by the optical system with an image-capturing unit, and outputting image information corresponding thereto; setting a degree to which focus adjustment based upon a focus adjustment state is temporarily prohibited; and selecting, based upon the degree that has been set, one of a first tracking control method in which the object is tracked based upon the focus adjustment states that have been detected at the plurality of focus detection positions, and a second tracking control method in which the object is tracked based upon the image information that is outputted by the image-capturing unit and reference image information that has been set as a reference.

According to the 19th aspect of the present invention, in the tracking method according to the 18th aspect, it is preferred that the focus adjustment is prohibited while tracking is being performed by one of the first tracking control method and the second tracking control method unit.

According to the 20th aspect of the present invention, in the tracking method according to the 18th aspect, it is preferred that: a plurality of degrees can be set; the relatively stronger degree among the plurality of degrees has been set, the more priority is given to the second tracking control method to be selected; and the focus adjustment is prohibited while tracking is being performed by the second tracking control method unit.

According to the 21st aspect of the present invention, in the tracking method according to the 20th aspect, it is preferred that the degree to which the focus adjustment is prohibited is set according to a length of a time period over which the focus adjustment is prohibited, and the stronger is the degree to which the focus adjustment is prohibited, the longer is the time period over which the focus adjustment is prohibited.

According to the 22nd aspect of the present invention, in the tracking method according to the 18th aspect, it is preferred that: the tracking method further comprises updating the reference image information based upon the image information that is repeatedly outputted; and a frequency of updating of the reference image information is lowered when the second tracking control method has been selected, as compared with when the first tracking control method has been selected.

According to the 23rd aspect of the present invention, in the tracking method according to the 18th aspect, it is preferred that: the tracking method further comprises repeatedly performing focus adjustment of the optical system; and the focus adjustment is temporarily prohibited, when the second tracking control method is selected, and a degree of resemblance between the image information and the reference image information is less than or equal to a predetermined value.

According to the 24th aspect of the present invention, in the tracking method according to the 18th aspect, it is preferred that: the tracking method further comprises repeatedly performing focus adjustment of the optical system; and the focus adjustment is temporarily prohibited, when the second tracking control method is selected, and tracking by the second tracking control method has become impossible.

According to the 25th aspect of the present invention, in the tracking method according to the 18th aspect, it is preferred that the degree of prohibition is set according to a degree of change of the image information that corresponds to a focus detection position that has been selected.

DESCRIPTION OF THE PREFERRED EMBODIMENTS

To track a photographic subject that is to be an object of tracking while detecting the focus adjustment state of a photographic lens in a plurality of focus detection areas that are set within a photographic scene (a photographic image field), in other words defocus amounts in these areas, and employing, as the area in which focus adjustment is to be performed, a focus detection area for which a defocus amount has been detected that is close to the defocus amount during the previous episode of focus adjustment, is termed an AF (automatic focus adjustment) tracking function. Furthermore, to track a photographic subject that is to be an object of tracking within a photographed image while storing an image of the photographic subject that is to be the subject of tracking as a template image (a reference image), and searching for a position within the repeatedly captured image that agrees with or resembles the template image, (i.e. template matching), is termed an image tracking function. An embodiment of an image-capturing device (a single lens reflex digital still camera) that includes a focus adjustment device that tracks a subject while driving the photographic lens according to this type of AF tracking function and image tracking function will now be explained with reference to the drawings.

Figure 1:
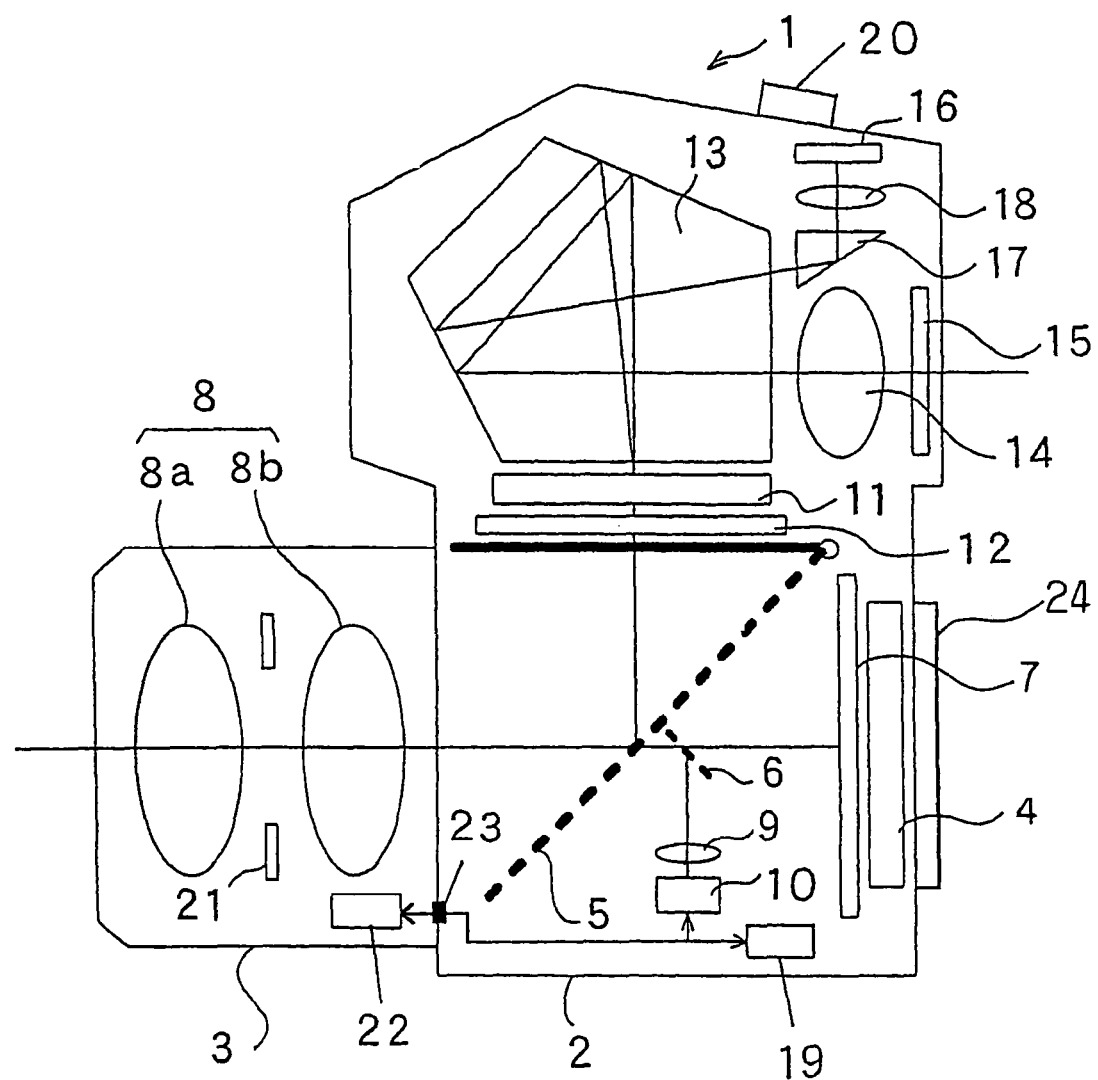
FIG. 1 is a figure showing the structure of one embodiment of the present invention.

FIG. 1 shows the structure of an image capturing device 1 (a single lens reflex digital still camera) that includes a focus adjustment device according to one embodiment of the present invention. It should be understood that devices and circuitry of the camera that have no direct relationship with the present invention are not shown in FIG. 1, and explanation thereof will be omitted. An interchangeable lens 3 is detachably fitted to the main body 2 of the camera 1 of this embodiment. A first image sensor 4 is provided to the camera main body 2 for capturing an image of a photographic subject and recording this image. This first image sensor 4 may be built as a CCD or CMOS sensor or the like. During photography, a quick return mirror 5 and a sub-mirror 6 are retracted to positions removed from the photographic optical path as shown by the solid lines, and a shutter 7 is opened, so that an image of the photographic subject is imaged by a photographic lens 8 upon a light reception surface of the first image sensor 4.

A focus detection optical system 9 and a range-finding element 10 are provided at the bottom portion of the camera main body 2, for detecting the focus adjustment state of the photographic lens 8. In this embodiment, an example is shown in which the split pupil phase detection method is employed as the method of focus detection. In the focus detection optical system 9, a pair of ray bundles for focus detection that have passed through the photographic lens 8 are conducted to a light reception surface of the range-finding element 10, and create a pair of optical images. The range-finding element 10 includes, for example, a pair of CCD line sensors, and outputs a focus detection signal that corresponds to the pain of optical images. Before photography, the quick return mirror 5 and the sub-mirror 6 are set to positions within the photographic optical path as shown by the broken line, and the pair of ray bundles for focus detection from the photographic lens 8 pass through a half mirror portion of the quick return mirror 5 and are reflected by the sub-mirror 6, thus being conducted to the focus detection optical system 9 and the range-finding element 10.

A viewfinder optical system is provided at the upper portion of the camera main body 2. Before photography, the quick return mirror 5 and the sub-mirror 6 are positioned as shown by the broken line, and the light of the photographic subject from the photographic lens 8 is reflected by the quick return mirror 5 and is conducted to a focus plate 11, so that an image of the photographic subject is imaged upon the focus plate 11. A liquid crystal display element 12 displays photographic information such as a focus detection area mark or the like superimposed over the image of the photographic subject that is imaged upon the focus plate 11, and also displays various types of photographic information such as the exposure value or the like at a position outside the image of the photographic subject. The image of the photographic subject upon the focus plate 11 and the photographic information displayed upon the liquid crystal display element 12 are conducted to an eyepiece window 15 via a roof pentaprism 13 and an eyepiece lens 14, so that it is possible for the photographer visually to check the image of the photographic subject and the photographic information.

Furthermore, a second image sensor 16 that captures an image of the photographic subject for photographic subject tracking and photometry is provided to the viewfinder optical system at the upper portion of the camera main body 2. The image of the photographic subject that is imaged upon the focus plate 11 is imaged for a second time upon the light reception surface of the second image sensor 16 via the roof pentaprism 13, a prism 17, and an imaging lens 18. And the second image sensor 16 outputs an image signal corresponding to this image of the photographic subject. The image of the photographic subject that is imaged upon the focus plate 11 before photography is conducted to the second image sensor 16 via the roof pentaprism 13, the prism 17, and the imaging lens 18, so that an image of the photographic subject is formed for a second time upon the light reception surface of the second image sensor 16. Image tracking control and exposure control are performed based upon this image of the photographic subject that is captured by the second image sensor 16; this matter will be described in more detail hereinafter.

A body drive control device 19, actuation members 20, and the like are further provided to the camera main body 2. The body drive control device 19 includes a microcomputer that will be described in detail hereinafter, and peripheral devices such as a memory, an A/D converter, and the like, and performs various types of control and calculations for the camera 1. The actuation members 20 include switches and/or selectors for actuating the camera 1, such as a shutter button, a focus detection area selection switch, a photographic mode selection switch, a focus adjustment mode selection switch, and the like.

As described above, in this embodiment, there are provided an AF tracking function in which the defocus amount of the photographic lens is detected in each of a plurality of focus detection areas that are set within the photographic scene, and the photographic subject that is to be the subject of tracking is tracked by using, as the area to perform focus adjustment, that focus detection area in which a defocus amount has been detected that is close to the defocus amount during the previous episode of focus adjustment, and also an image tracking function in which an image of the photographic subject that is the tracking subject within the photographic image is stored as a template image (a reference image), and the photographic subject that is to be the subject of tracking is tracked while searching within the image that is repeatedly captured for the position of an image that agrees with or resembles the template image. And the position of the tracking subject, in other words the focus detection area in which to perform focus adjustment (the focus adjustment area), is determined based upon the AF tracking result or the image tracking result.

In this embodiment a setting member is provided to the actuation member, for setting the degree to which focus adjustment is temporarily prohibited. In this embodiment, this setting member is called the "lock on setting member". In other words, focus adjustment of the photographic lens is temporarily prohibited by a setting with this lock on setting member, and by this means it becomes impossible to perform tracking an obstruction imprudently being allowed to come between the camera and the photographic subject for example, then it becomes possible subsequently to continue tracking of the photographic subject that was being tracked until that moment, by using this lock on setting member. In other words, in this embodiment, locking on is performed by temporarily prohibiting focus adjustment. The degree to which focus adjustment is temporarily prohibited is termed the "lock on strength". The extent of consideration of the image tracking result compared with the AF tracking result when the focus adjustment area is determined, is adjusted with this lock on setting member.

This lock on setting member can be set to any of three stages "none", "weak", and "strong" in which the proportion of employment of the result of image tracking becomes higher in the order, "none"→"weak"→"strong"; or, to put it in another manner, with regard to the result of image tracking, the degree of consideration that is accorded to the AF tracking result becomes stronger in that order. In other words, if the setting member is set to "none", then the focus adjustment area is determined, and focus adjustment is performed, only based upon the result of AF tracking, without giving any consideration at all to the result of image tracking. And, if the setting member is set to "strong", then the focus adjustment area is determined, and focus adjustment is performed, by giving priority to the result of image tracking over the result of AF tracking.

A zooming lens 8*a*, a focusing lens 8*b*, an iris 21, a lens drive control device 22 and the like are provided to the interchangeable lens 3. It should however be understood that although, in this embodiment, the photographic lens 8 is superficially shown by the zooming lens 8*a*, the focusing lens 8*b*, and the iris 21, the structure of the photographic lens 8 is not limited to the structure shown in FIG. 1. The lens drive control device 22 includes a microcomputer and peripheral devices such as a memory, a drive circuit, an actuator, a sensor and the like not shown in the figures, and performs drive control of the lenses 8*a* and 8*b* and the iris 21 and detection of their positions. Information such as the focal length of the interchangeable lens 3 and the maximum aperture value thereof and the like is stored in a memory that is housed internally to the lens drive control device 22.

The body drive control device 19 and the lens drive control device 22 perform communication via a contact point 23 upon the lens mounting portion. Information such as the lens drive amount and the aperture value to be controlled and the like is transmitted from the body drive control device 19 to the lens drive control device 22. On the other hand, information such as the focal length by the zooming lens 8*a*, the photographic distance by the focusing lens 8*b*, the aperture value and the like is transmitted from the lens drive control device 22 to the body drive control device 19. A monitor 24 is provided upon the rear surface of the camera main body 2, and displays various types of photographic information, as well as a through image (a live view image) and the photographed image.

Figure 2:
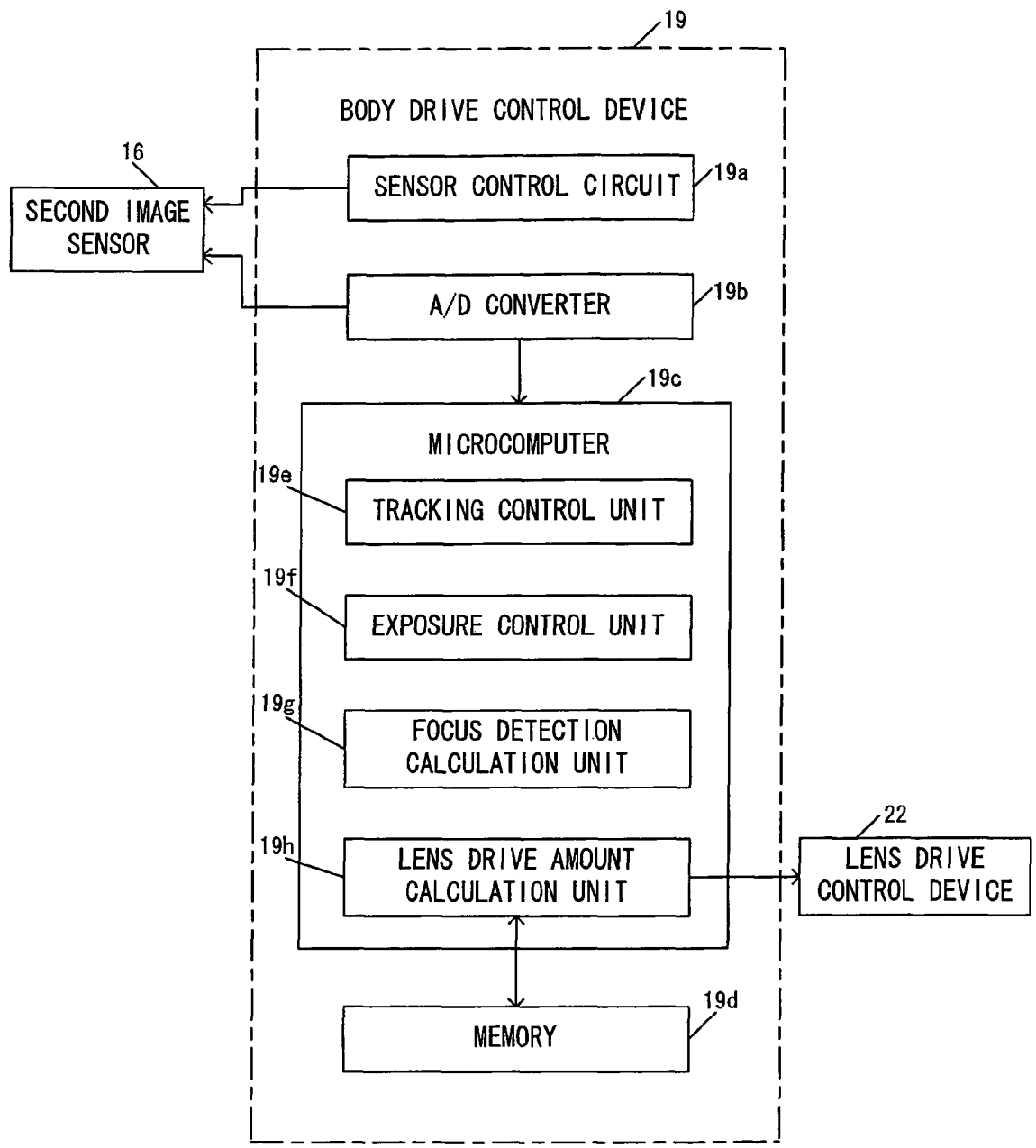
FIG. 2 is a figure showing the detailed structure of a body drive control device of the embodiment.

FIG. 2 shows the detailed structure of the body drive control device 19. It should be understood that control functions that have no direct relationship to the present invention are not shown in this figure, and explanation thereof will be omitted. This body drive control device 19 includes a sensor control circuit 19*a*, an A/D converter 19*b*, a microcomputer 19*c*, a memory 19*d*, and the like. The sensor control circuit 19*a* controls accumulation of electric charge by the second image sensor 16 and reading out thereof. The A/D converter 19*b* converts an analog image signal outputted from the second image sensor 16 to a digital image signal. The microcomputer 19*c* includes a tracking control unit 19*e*, an exposure control unit 19*f*, a focus detection calculation unit 19*g*, and a lens drive amount calculation unit 19*h*, all of which are implemented in software.

A memory 9*d* stores information such as a template image (a reference image) for image tracking and defocus amounts for AF tracking and the like, lens information such as the focal length of the photographic lens 8, the maximum aperture value, the aperture value, a conversion coefficient between the amount of deviation of the image and the defocus amount, and so on, a continuous time period for temporarily prohibiting the driving of the focusing lens 8*b*, and threshold values and predetermined values that are used in various types of decision, and the like.

The tracking control unit 19*e* stores in the memory 19*d*, as a template image (a reference images), an image within the image of the photographic subject captured by the second image sensor 16 that corresponds to the position of a tracking subject that has been manually designated by the photographer, or to the position of a tracking subject that has been set automatically by the camera 1, and thereafter recognizes the position of the tracking subject by searching from within the images that are repeatedly photographed by the second image sensor 16 for an image region that agrees with, or that resembles, this template image. And the exposure calculation unit 19*f* calculates an exposure value based upon the image signal that has been captured by the second image sensor 16.

The focus detection calculation unit 19*g* detects the focus adjustment state of the photographic lens 8 based upon a focus detection signal corresponding to the pair of optical images outputted from the range-finding element 10, and thereby detects the defocus amount. Although this matter will be described in detail hereinafter, it should be understood that a plurality of focus detection areas are set within the scene (image field) photographed by the photographic lens 8, and, for each of these focus detection areas, the range-finding element 10 outputs a focus detection signal that corresponds to the respective pair of optical images, and then the focus detection calculation unit 19*g* detects the defocus amount for each of these focus detection areas, based upon the focus detection signal that corresponds to its respective pair of optical images.

Figure 3:
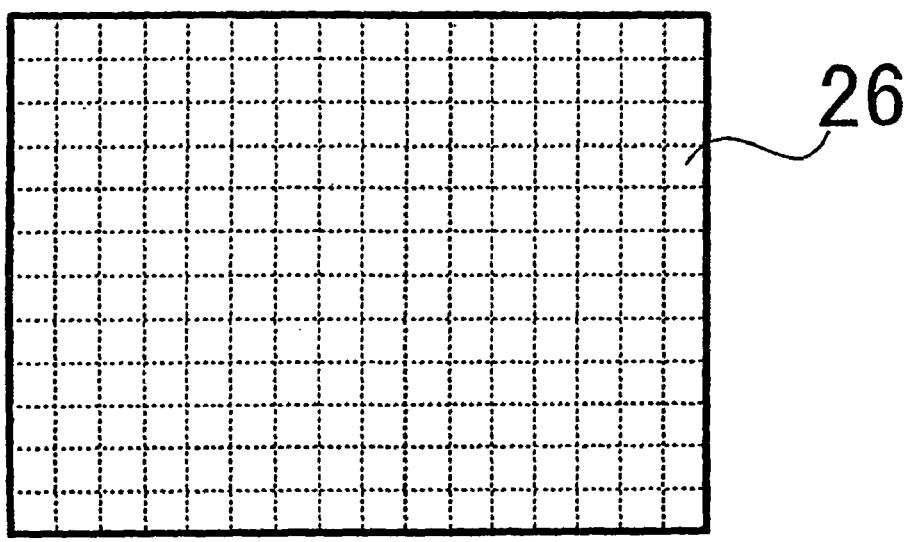
FIG. 3 is a figure showing the detailed structure of a second image sensor.
Figure 4:
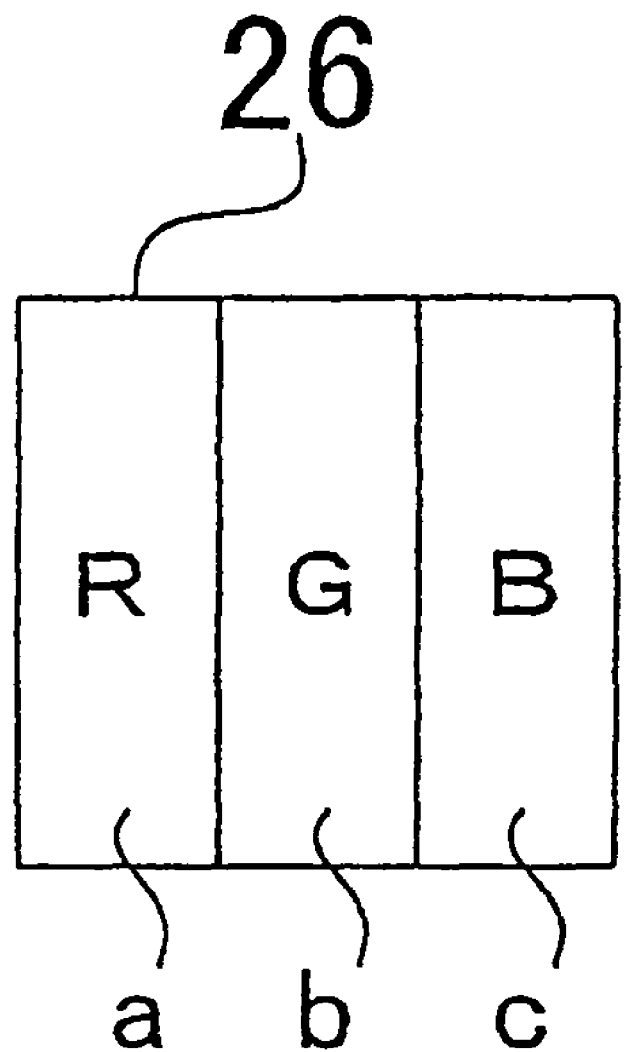
FIG. 4 is a figure showing the detailed structure of a pixel of this second image sensor.

FIG. 3 is an elevation view showing the detailed structure of the second image sensor 16. The second image sensor 16 includes a plurality of pixels (picture elements, photoelectric conversion elements) 26 arranged in the form of a matrix (in this embodiment 16 horizontally by 12 vertically, for a total of 192). Each of these pixels 26 is divided into three portions 26*a*, 26*b*, and 268 as shown in FIG. 4, and respective red R, green G, and blue B primary color filters are provided to these portions 26*a*, 26*b*, and 26*c*. Due to this, each of the pixels 26 is able to output an RGB signal, so as to make up an image of the photographic subject. It should be understood that the number of pixels of the second image sensor 16 is not to be considered as being limited to the number shown in the figure and described above.

Next, photographic subject tracking operation of the embodiment will be explained. FIGS. 5 through 7B are figures for explanation of the method for photographic subject tracking of this embodiment, and FIGS. 8 through 13 are flow charts showing photographic subject tracking control of the embodiment. The body drive control device 19 starts tracking processing of the photographic subject when the photographer designates a tracking subject region manually within the image of the photographic subject that is captured by the second image sensor 16, or when, after the camera has set a tracking subject region automatically, the photographer half presses the shutter button of the actuation members 20.

It should be understood that, apart from when photography is being performed by the shutter button being full pressed, the quick return mirror 5 is set into the photographic optical path as shown by the broken line in FIG. 1, and the light from the photographic subject that is incident from the photographic lens 8 is imaged upon the focus plate 11. And the image of the photographic subject upon the focus plate 11 is conducted to the second image sensor 16 via the roof pentaprism 13, the prism 17, and the imaging lens 18, and a signal representing an image of the photographic subject is repeatedly outputted from the second image sensor 16.

Figure 5:
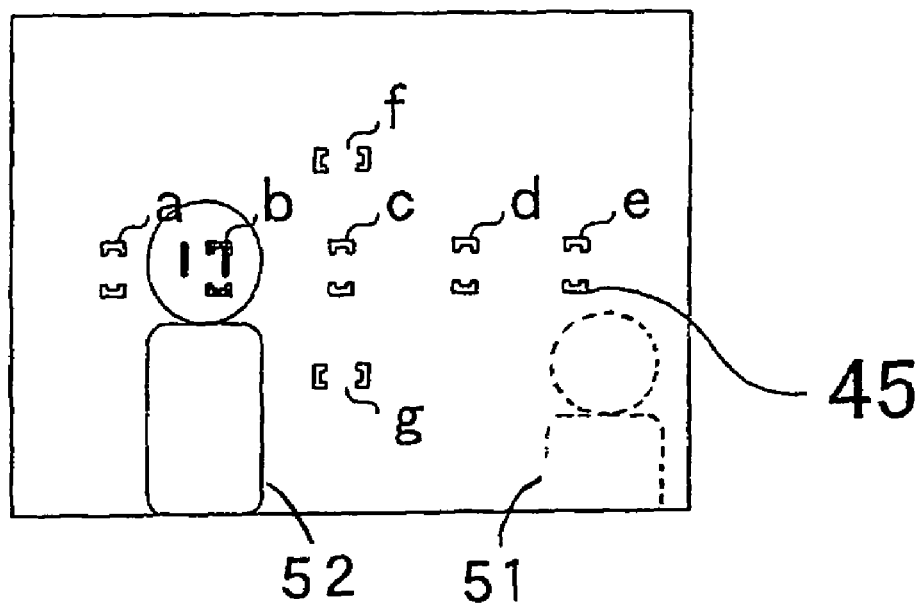
FIG. 5 is a figure for explanation of a method of tracking a photographic subject.

FIG. 5 schematically shows an image of a photographic subject (a viewfinder image) that the photographer can visually check through the eyepiece window 15. Photographic information such as focus detection area marks and the like is displayed by the liquid crystal display element 12 as superimposed over the image of the photographic subject that has been imaged by the photographic lens 8 upon the focus plate 11, and this image is conducted to the eyepiece window 15 via the roof pentaprism 13 and the eyepiece lens 14, so that the photographer is able visually to check the image of the photographic subject and the photographic information. In this embodiment, seven focus detection areas 45*a* through 45*g* are set within the photographic image field (view) of the photographic lens 8, and the positions of these focus detection areas 45*a* through 45*g* as displayed as area marks by the liquid crystal display element 12, superimposed upon the image of the photographic subject upon the focus plate 11. When any desired area is selected with the focus detection area selection switch of the actuation members 20, then the mark 45 for this area is displayed as illuminated.

Figure 8:
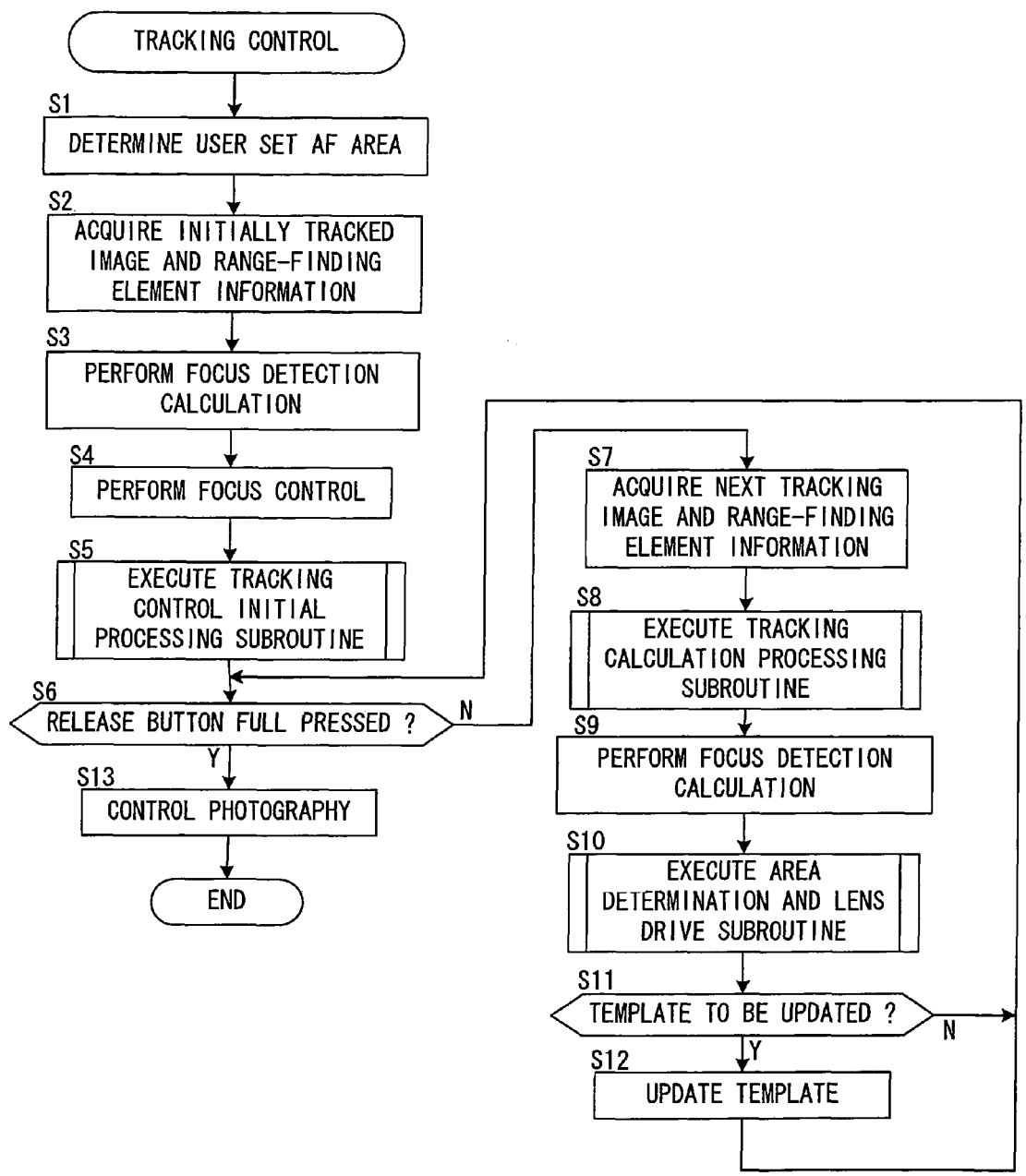
FIG. 8 is a flow chart showing tracking control according to the embodiment.

In a step S1 of FIG. 8, the focus detection area 45*b* as shown in FIG. 5 is selected with the focus detection area selection switch of the actuation members 20, and when, in this state, the shutter button of the actuation members 20 is half pressed, along with this focus detection area 45*b* being stored in the memory 19*d* as a user set AF area, also a photographic subject to be tracked is designated. It should be understood that although, here, an example is shown in which the photographer designates a user set AF area and a photographic subject as the subject for tracking manually, it would also be acceptable, if for example the camera is endowed with a function of recognizing a photographic subject automatically, for the AF area and the photographic subject to be tracked to be set based upon the result of automatic recognition of the photographic subject by the camera.

In a step S2, an initially tracked image for use both by image tracking and exposure control is acquired by the second image sensor 16, and also a pair of optical images corresponding to each of the focus detection areas 45*a* through 45*g* is acquired by the range-finding element 10.

Here, the initially tracked image is designated by the RGB values of each of its pixels:

$$R[x,y], G[x,y], B[x,y] \quad (1)$$

Based upon these RGB values, the color information RG and BG (in this embodiment, the hue) for each of the pixels is calculated, and also the luminance information L is calculated based upon the exposure time period T, the gain G, and the color synthesis coefficients Kr, Kg, and Kb when the image was acquired:

$$RG[x,y] = \mathrm{Log}_2(R[x,y]) - \mathrm{Log}_2(G[x,y]),$$

$$BG[x,y] = \mathrm{Log}_2(B[x,y]) - \mathrm{Log}_2(G[x,y]),$$

$$L[x,y] = \mathrm{Log}_2(Kr \times R[x,y] + Kg \times G[x,y] + Kb \times B[x,y]) - \mathrm{Log}_2(T) - \mathrm{Log}_2(\mathrm{Gain}) \quad (2)$$

This color information RG and BG and the luminance information L are stored in the memory 19*d* for use as a template image.

In a step S3, the focus adjustment states of the photographic lens 8 in each of the focus detection areas 45*a* through 45*g*, in other words the defocus amounts, are detected based upon the focus detection signals. And in a step S4, the defocus amount that has been detected for the user set area 45*b* is converted into a lens drive amount, and this lens drive amount is transmitted to the lens drive control device 22. The lens drive control device 22 drives the photographic lens 8 according to this lens drive amount, and thereby performs focus adjustment.

Figure 6A:
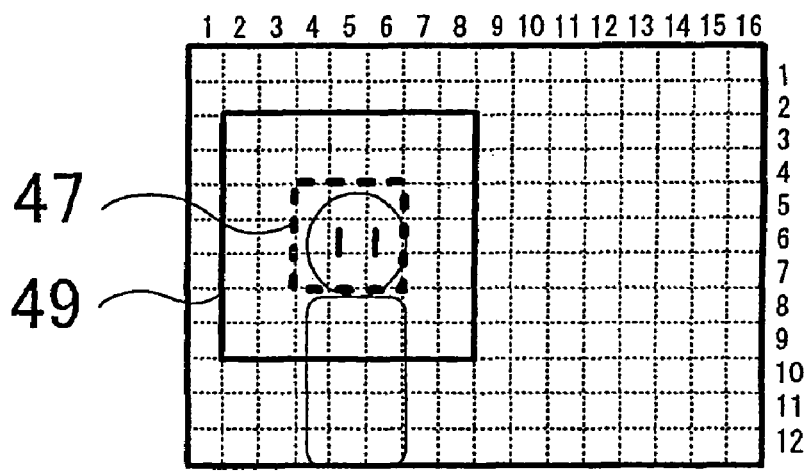
FIGS. 6A and 6B are further figures for explanation of this photographic subject tracking method.
Figure 6B:
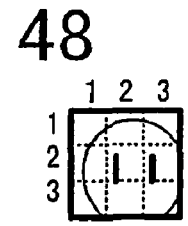
Figure 9:
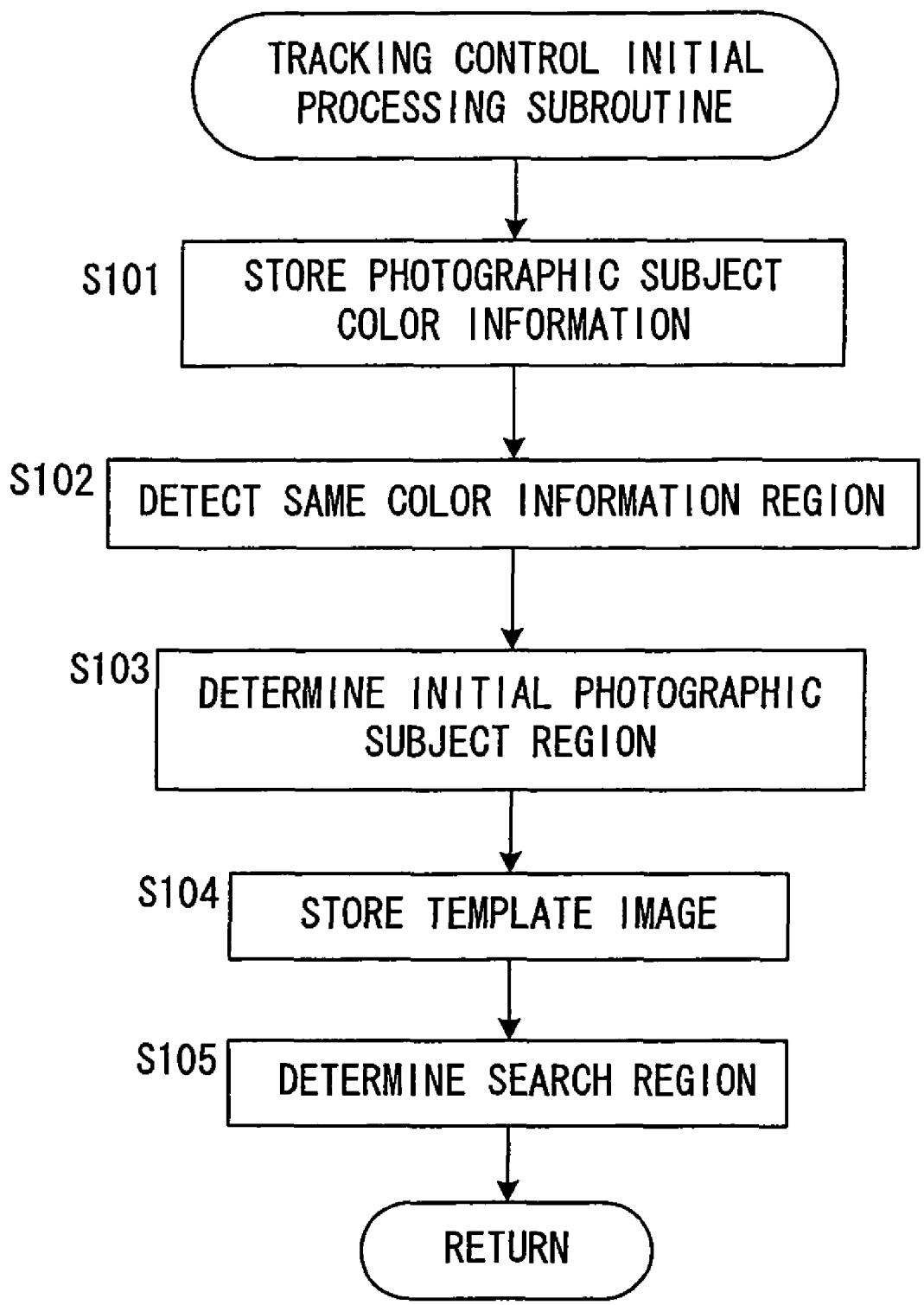
FIG. 9 is a flow chart showing a routine for tracking control initial processing.

In a step S5, a tracking control initial processing subroutine shown in FIG. 9 is executed. In a step S101 of this FIG. 9 subroutine, the photographic subject color information of the image of a region within the initially tracked image that corresponds to the focus detection area 45 (the user set AF area) is stored. And in a step S102, as shown in FIG. 6A, a same color information region is detected that has the same color information as the photographic subject color information at the peripheral portion of the focus detection area 45b within the initially tracked image, and then in the next step S103 this same color information region is taken as being an initial tracking photographic subject region 47. It should be understood that although, here, an example is shown in which the tracking photographic subject region 47 is determined based upon the photographic subject color information, it would also be acceptable, in order to be able to simplify the processing, to arrange to unify the sizes of all of the tracking photographic subject regions at 3×3 pixels, or to determine the size of the photographic subject region according to the distance information of the photographic lens 8.

In a step S104, an image of the tracking photographic subject region 47 within the initially tracked image is stored in the memory 19d as a template image 48 (refer to FIG. 6B) for subsequent tracking processing. For example, if as shown in FIG. 6A the starting point position of the tracking photographic subject region 47 is (x,y)=(4,5), then the color information (here the hue) RGref and BGref and the luminance information Lref of the template image 48 are given as follows:

$$RGref[rx,ry]=RG[x,y],$$

$$BGref[rx,ry]=BG[x,y],$$

$$Lref[rx,ry]=L[x,y] (rx,ry=1\sim3, x=4\sim6, y=5\sim7) \quad (3)$$

And, in a step S105, a region consisting of the tracking photographic subject region 47 enlarged by a predetermined number of pixels (here this number of pixels is taken as being two) upwards and downwards, and leftwards and rightwards, is set as the search region 49, and is stored in the memory 19d. In the example shown in FIG. 6A, this search region 49 becomes the region x=2~8, y=3~9. Thereafter, the flow of control returns to the step S6 of the FIG. 8 routine.

When this initial processing for tracking control has been completed, the flow of control proceeds to the step S6 of the FIG. 8 flow chart, and a decision is made as to whether or not the shutter button of the actuation members 20 has been fully pressed, in other words as to whether or not shutter release actuation has been performed. If shutter release actuation has not been performed then the flow of control proceeds to a step S7, and, along with acquiring the next tracking image for both image tracking and also exposure control from the second image sensor 16, a pair of optical images for focus detection are acquired by the range-finding element 10 for each of the focus detection areas 45a through 45g. It should be understood that the color information RG[x, y], BG[x,y] and the luminance information L[x,y] are calculated and are stored in the memory 19d, in a similar manner to the processing in the step S2 described above. And next, in a step S8, a tracking calculation processing subroutine shown in the flow chart of FIG. 10 is executed.

Figure 7B:
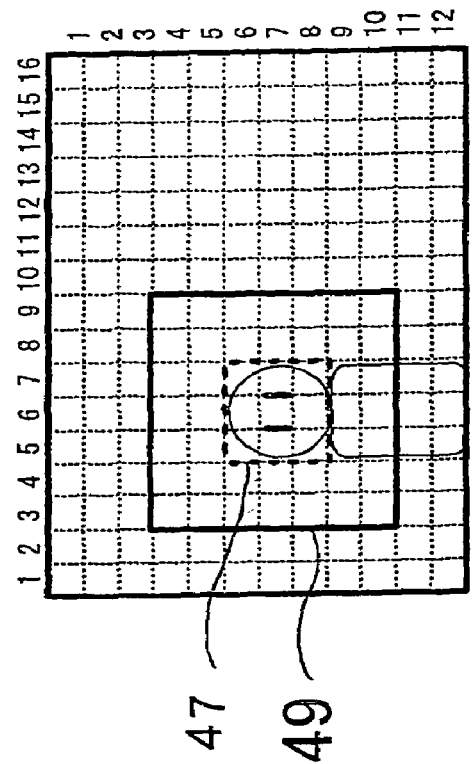
FIGS. 7A and 7B are further figures for explanation of this photographic subject tracking method.
Figure 7A:
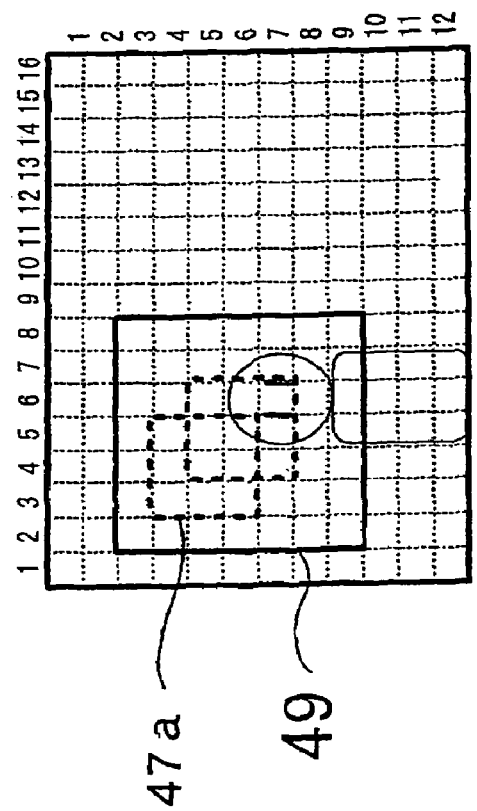
Figure 10:
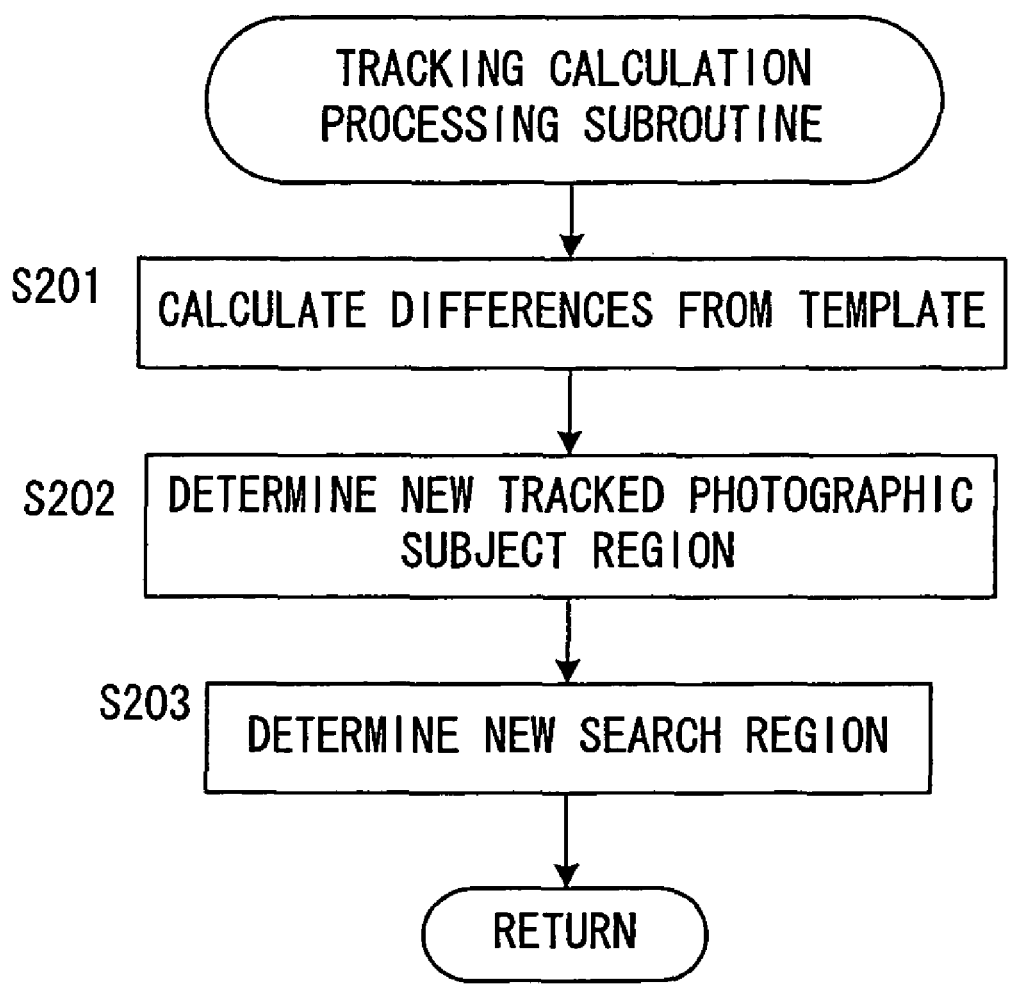
FIG. 10 is a flow chart showing a routine for tracking calculation processing.

In a step S201 of FIG. 10, regions of the same size as the template image 48 are sequentially cut out from the search region 49 within the image for tracking, and a color information difference Diff is calculated for each of the pairs of corresponding pixels in the image that has thus been cut out and the template image 48. As shown in FIG. 7A, the color information difference Diff with the template image 48 is calculated while shifting the region 47a that has been cut out one pixel at a time within the search region 49.

Now, if as shown in FIG. 7A the starting point position (scx,scy) of the search region 49 is (2,3), then the calculation of the difference Diff is performed as follows:

$$Diff[dx,dy]=\Sigma\Sigma$$

$$\{ABS(RG[scx+dx-1+rx,scy+dy-1+ry]-RGref[rx,ry])+ABS(BG[scx+dx-1+rx,scy+dy-1+ry]-BGref[rx,ry])+ABS(L[scx+dx-1+rx,scy+dy-1+ry]-Lref[rx,ry])\} \quad (4)$$

In Equation (4), dx,dy=1~5, rx,ry=1~3, scx=2, scy=3, and $\Sigma\Sigma$ represents the calculation of the sum as rx and ry vary from 1 to 3.

Next, in a step S202, the minimum difference minDiff among the differences Diff[dx,dy] is found, and the above described cut out region 47a within the search region 49 for which this minimum difference minDiff was calculated is determined as being the new tracking photographic subject region. Here, as shown in FIG. 7B, the cut out region whose starting point position is (x,y)=(5,6) is taken as being the new tracking photographic subject region 47.

And, in a step S203, a region that consists of the new tracking photographic subject region 47 in the center, enlarged by a predetermined number of pixels (here, by two pixels) on each side, i.e. upwards, downwards, leftwards, and rightwards, is set as the new search region 49. Here, as shown in FIG. 7B, the region x=3~9, y=4~1 is set as the new search region 49. Then the flow of control returns to a step S9 of the FIG. 8 flow chart.

After return, in the step S9 of the FIG. 8, based upon the pairs of optical images that correspond to each of the focus detection areas 45a through 45g that were acquired by the range-finding element 10 in the step S7 described above, defocus amounts for all of the focus detection areas 45a through 45g (i.e. focus adjustment states of the photographic lens 8) are detected. And next, in a step S10, an area determination and lens drive subroutine shown in FIGS. 11 through 13 is executed, a focus detection area (i.e. a focus adjustment area) in which focus adjustment is to be performed is determined, and the photographic lens 8 is driven for focus adjustment.

Figure 11:
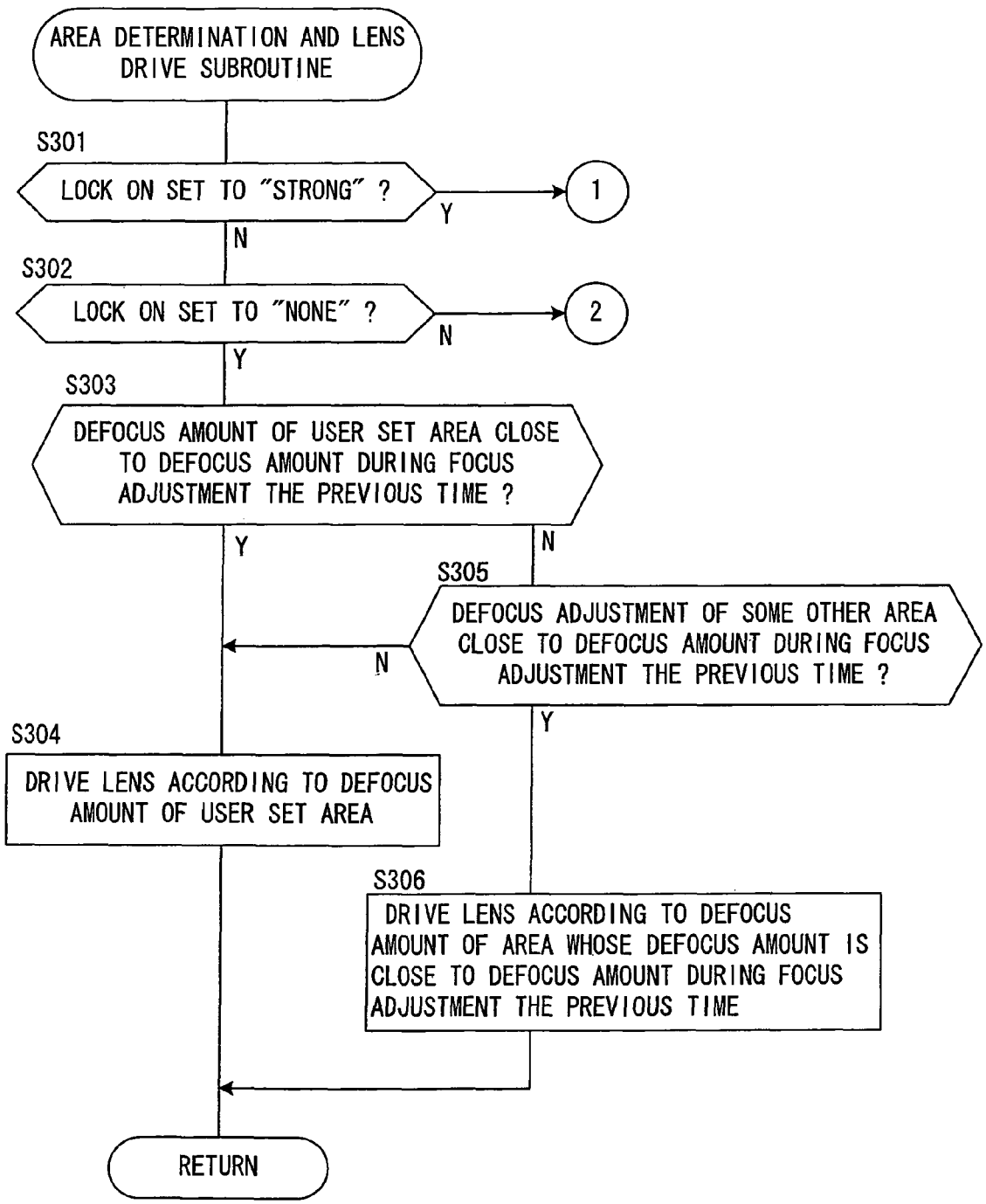
FIG. 11 is a flow chart showing an area determination lens drive routine.
Figure 12:
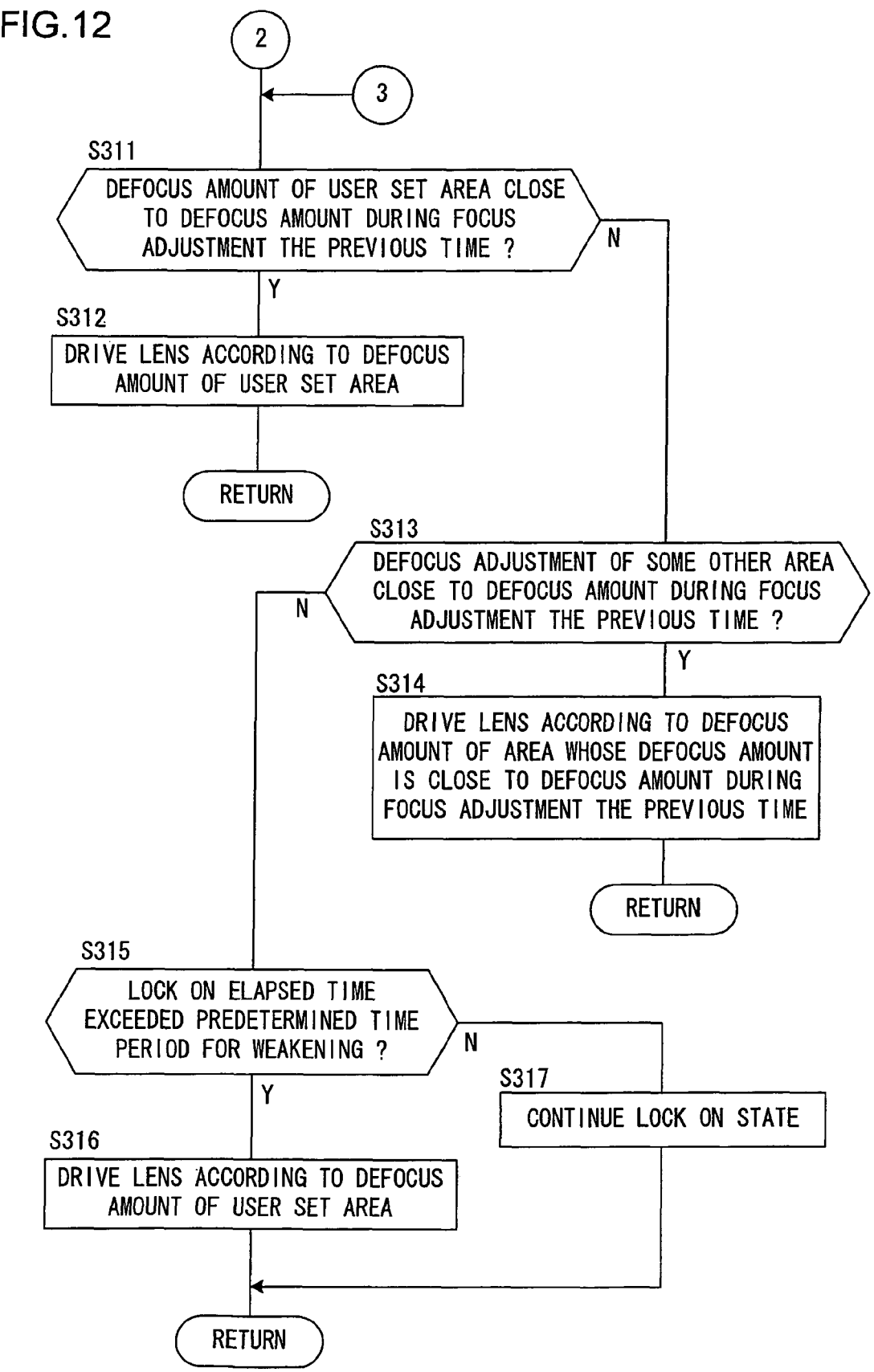
FIG. 12 is a flow chart continuing on from FIG. 11, further showing this area determination lens drive routine.
Figure 13:
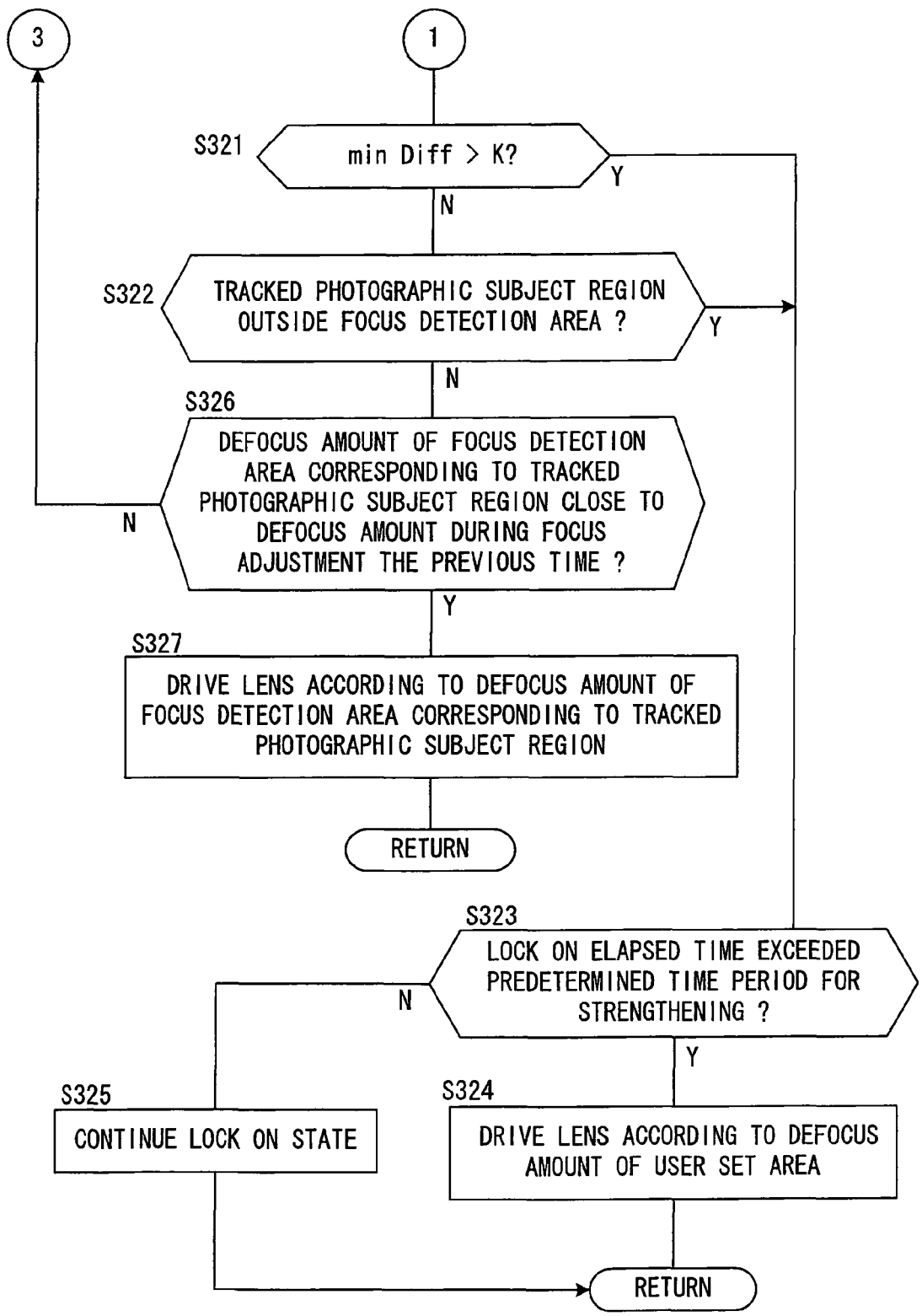
FIG. 13 is a flow chart continuing on from FIG. 12, and further showing this area determination lens drive routine.

In a step S301 of the FIG. 11 flow chart, a decision is made as to whether or not the lock on setting member of the actuation members 20 is set to "strong", and, if it is set to strong, then the focus adjustment area determination processing routine shown in FIG. 13 for the "strong" setting is executed. If the lock on setting member is not set to "strong", then the flow of control proceeds to the step S302, and a decision is made as to whether or not the lock on setting member of the actuation members 20 is set to "none". If the lock on setting member is set to "none", then the focus adjustment area determination processing routine shown in FIG. 13 for the "none" setting is executed; while if it is not set to "none", then the focus adjustment area determination processing routine shown in FIG. 12 for the "weak" setting is executed.

First, the focus adjustment area determination processing shown in FIG. 11 for when the lock on setting member is set to "none" will be explained. In a step S303 of the FIG. 11 flow chart, a decision is made as to whether or not the defocus amount that has been detected this time in the user set AF area (i.e. in the user set AF area that was stored in the memory 19d in the step S1 of the FIG. 8 flow chart, that in this example is the focus detection area 45b shown in FIG. 5) (refer to the step S9) is close to the defocus amount during focus adjustment the previous time, in other words to the defocus amount of the focus detection area that was employed as the focus adjustment area during focus adjustment the previous time. If the difference between these two is less than or equal to a decision threshold value that has been set in advance for considering them both to be the same photographic subject, then the flow of control proceeds to a step S304, in which the defocus amount that was detected this time for the user set AF area is converted into a lens drive amount, and the focusing lens 8b is driven by the lens drive control device 22 according to this lens drive amount, so that focus adjustment is performed.

On the other hand, if in the step S303 the difference between the defocus amount of the user set AF area and the defocus amount during focus adjustment the previous time is greater than the above described decision threshold value, then it is decided that these are not the same photographic subject and the flow of control proceeds to a step S305, in which a decision is made as to whether or not, among the defocus amounts that have been detected this time for the focus detection areas other than the user set AF area, there is one of them that is close to the defocus amount of the focus detection area that was employed as the focus adjustment area during the previous episode of focus adjustment, in other words as to whether or not there is one of them for which the difference between them is less than or equal to the above described decision threshold value. If there is some such defocus amount for which the difference is less than the decision threshold value, then it is decided that the photographic subject for the focus detection area is the same as the photographic subject that was the subject of tracking during the previous episode of focus adjustment, and the flow of control proceeds to a step S306, in which this defocus amount is converted into a lens drive amount, and the focusing lens 8b is driven by the lens drive control device 22 according to this lens drive amount, so that focus adjustment is performed.

It should be understood that if, in this step S305, even for the focus detection areas outside the user set AF area there is no defocus amount for which the difference is less than the decision threshold value, in other words if no defocus amount is found for which the difference with any of the focus detection areas is less than the decision threshold value, then the flow of control is transferred to the step S304, and the defocus amount that has been detected for the user set area this time is converted into a lens drive amount, and the focusing lens 8b is driven by the lens drive control device 22 according to this lens drive amount, so that focus adjustment is performed.

In this manner, when the lock on setting member of the actuation members 20 is set to "none", the focus adjustment area is determined, and focus adjustment is performed, only according to the result of AF tracking, without any consideration at all being accorded to the result of image tracking. In other words, if the defocus amount of the user set AF area is close to the defocus amount during focus adjustment the previous time, then it is decided that the photographic subject is being tracked in the user set AF area, and focus adjustment is performed based upon the defocus amount of the user set AF area. Furthermore, if the defocus amount of the user set AF area is not close to the defocus amount during focus adjustment the previous time, then, from among the other focus detection areas, an area is searched for which has a defocus amount that is close to the defocus amount during focus adjustment the previous time, and this area is taken as the focus adjustment area. In other words, if the lock on setting member is set to "none", then the AF tracking is performed with priority being accorded to the user set AF area, and pausing of the driving of the photographic lens, in other words "locking on", is not performed.

Next, the focus adjustment area determination processing shown in the flow chart of FIG. 12 for when the lock on setting member is set to "weak" will be explained. In a step S311, a decision is made as to whether or not the defocus amount in the user set AF area that has been detected this time is close to the defocus amount of the focus detection area that was employed as the focus adjustment area during focus adjustment the previous time. If the difference between the two of them is less than a decision threshold value that is set in advance for considering them as being the same photographic subject, then the flow of control proceeds to a step S312, and the defocus amount in the user set AF area that has been detected this time is converted into a lens drive amount, and the focusing lens 8b is driven by the lens drive control device 22 according to this lens drive amount, so that focus adjustment is performed.

On the other hand, if in the step S311 it has been decided that the difference between the defocus amount for the user set AF area and its defocus amount during focus adjustment the previous time is greater than the above described decision threshold value, then the flow of control is transferred to a step S313, in which a decision is made as to whether or not, among the defocus amounts that have been detected this time for the focus detection areas other than the user set AF area, there is one for which the defocus amount is close to the defocus amount of the focus detection area that was employed as the focus adjustment area during focus adjustment the previous time, in other words as to whether or not there is one for which the difference between the two of them is less than or equal to the above described decision threshold value. If there is a defocus amount for which the difference is less than or equal to the decision threshold value, then it is decided that the photographic subject in the focus detection area is the same as the photographic subject that was being tracked during the previous episode of focus adjustment, and the flow of control proceeds to a step S314, in which this defocus amount is converted into a lens drive amount, and the focusing lens 8b is driven by the lens drive control device 22 according to this lens drive amount, so that focus adjustment is performed.

If, among both the user set AF area and the other focus detection areas, there is no defocus amount close to the defocus amount of the focus detection area that was employed as the focus adjustment area during focus adjustment the previous time, then the flow of control proceeds to a step S315, and a decision is made as to whether or not the elapsed time from when driving of the photographic lens 8 was temporarily prohibited (i.e. focus adjustment was temporarily prohibited) has exceeded a predetermined time period for weakening that is determined in advance. If the elapsed time from temporary prohibition of driving of the photographic lens has exceeded the predetermined time period for weakening, then the flow of control proceeds to a step S316, the lock on setting is cancelled, and the defocus amount that has been detected this time in the user set AF area is converted into a lens drive amount, and the focusing lens 8b is driven by the lens drive control device 22 according to this lens drive amount, so that focus adjustment is performed. On the other hand, if the elapsed time from temporary prohibition of driving of the photographic lens has not reached the predetermined time period for weakening, then the flow of control proceeds to a step S317, and the temporary prohibition of driving of the photographic lens is continued.

In this manner, when the lock on setting member of the actuation members 20 is set to "weak", in a similar manner to when it is set to "none" as described above, the focus adjustment area is determined, and focus adjustment is performed, only according to the AF tracking result, with no consideration being accorded to the image tracking result. However, if the photographic subject that was being tracked during focus adjustment the previous time cannot be detected in any of the focus detection areas, then, by contrast to the case when the lock on setting member is set to "none" in which the user set AF area is taken as being the focus adjustment area, in this case in which the lock on setting member is set to "weak", driving of the photographic lens 8 is temporarily prohibited and "lock on" is applied. In other words, in this case in which the lock on setting member is set to "weak", lock on is performed at low strength.

Finally, the focus adjustment area determination processing of FIG. 13 when the lock on setting member is set to "strong" will be explained. In a step S321, a decision is made as to whether or not the degree of resemblance between the color information for the tracking photographic subject region 47 this time and the color information of the template image 48 is low. In other words, if the minimum value minDiff of the difference Diff with the color information of the above described template image 48 is greater than a resemblance decision threshold value K that is set in advance, so that the degree of resemblance between them is low, then the flow of control proceeds to a step S323. On the other hand, if this minimum difference minDiff is less than or equal to the threshold value K so that the degree of resemblance between them is high, then the flow of control proceeds to a step S322, in which it is determined whether or not the tracking photographic subject region 47 is outside the focus detection area. If no focus detection area exists that corresponds to the tracking photographic subject region 47, then the flow of control proceeds to the step S323, while if a focus detection area exists that corresponds to the tracking photographic subject region 47, then the flow of control proceeds to a step S326.

It should be understood that since the possibility is high that, even outside the range of the tracking photographic subject region 47, the focus detection area in its neighborhood will also overlap the photographic subject that is being tracked, accordingly it would also be acceptable to arrange for the focus detection areas of this type in the neighborhood of the tracking photographic subject region 47 also to be focus detection areas that correspond to the tracking photographic subject region 47.

If the color information of the tracking photographic subject region 47 this time does not resemble the color information of the template image 48, or if no focus detection area exists that corresponds to the tracking photographic subject region 47 this time, then in the step S323 a decision is made as to whether or not the elapsed time from when driving of the photographic lens 8 was temporarily prohibited has exceeded a predetermined time period for strengthening that is set in advance. If the elapsed time of temporary prohibition of driving of the photographic lens has exceeded the predetermined time period for strengthening, then the flow of control proceeds to a step S324, the temporary prohibition of driving the photographic lens 8 is cancelled, and the defocus amount that has been detected this time in the user set AF area is converted into a lens drive amount, and the focusing lens 8*b* is driven by the lens drive control device 22 according to this lens drive amount, so that focus adjustment is performed. On the other hand, if the elapsed time of temporary prohibition of driving of the photographic lens has not yet reached the predetermined time period for strengthening, then the flow of control proceeds to a step S325, and the lock on state is continued. It should be understood that the predetermined time period for strengthening is set to a longer time period than the predetermined time period for weakening described above.

On the other hand, if the color information of the tracking photographic subject region 47 this time resembles the color information of the template image 48, and moreover a focus detection area does exist that corresponds to the tracking photographic subject region 47 this time, then in the step S326 a decision is made as to whether or not the defocus amount of the focus detection area that corresponds to the tracking photographic subject region 47 is close to the defocus amount of the focus detection area that was employed as the focus adjustment area during the previous episode of focus adjustment, in other words as to whether or not the difference between these two is less than or equal to the decision threshold value described above. It should be understood that, if a plurality of focus detection areas that correspond to the tracking photographic subject region 47 exist, that focus detection area is selected for which the difference between the defocus amounts is minimum. If the difference is a defocus amount that is less than or equal to the decision threshold value, then the flow of control proceeds to a step S327, this defocus amount is converted into a lens drive amount, and the focusing lens 8*b* is driven by the lens drive control device 22 according to this lens drive amount, so that focus adjustment is performed.

On the other hand, if there is no defocus amount among the defocus amounts of the focus detection areas that correspond to the tracking photographic subject region 47 for which the difference is less than or equal to the decision threshold value, then the flow of control is transferred to the step S311 of the FIG. 12 flow chart, and the above described focus adjustment area determination processing during the setting to "weak" is executed.

In this manner, when the lock on setting member of the actuation members 20 is set to "strong", the focus adjustment area is determined, and focus adjustment is performed, based upon the image tracking result and upon the AF tracking result. In other words, among the focus detection areas that correspond to the tracking photographic subject region 47 that is the image tracking result, the same photographic subject is searched for as the photographic subject that was the object of tracking during focus adjustment the previous time, and the focus detection area in which the same photographic subject is captured is taken as the focus adjustment area. However, if the result of template matching is that it has not been possible to detect, from among the image captured this time, a tracking photographic subject region whose degree of resemblance is high, or if, although a tracking photographic subject region can be detected, it is outside the range of the focus detection area, then it is considered that it has not been possible to obtain a good image tracking result, and driving of the photographic lens 8 is temporarily prohibited and the lock on state is applied.

For example when, as shown in FIG. 5, a photographic subject 51 that was the object of tracking during the previous episode of focus adjustment is faraway from the focus detection areas 45*a* through 45*g*, the tracking photographic subject region that is the result of image tracking is undesirably outside the focus detection areas. If, in this type of case, photographic subject tracking is performed only with the AF tracking function, and if another photographic subject 52 for which the photographic distance is almost equal to which of the photographic subject 51 that is to be the object of tracking has entered one of the focus detection areas 45*a* through 45*g*, then this other photographic subject 52 will be mistakenly identified as being the same as the photographic subject that was the subject of tracking during the previous episode of focus adjustment, and the system will start tracking this other photographic subject 52 without entering upon temporary prohibition of driving of the photographic lens 8.

Thus, in this embodiment, when the lock on setting member is set to "strong", since the focus adjustment area is determined based upon both the image tracking result and also the AF tracking result, driving of the photographic lens is temporarily prohibited (the lock on mode) when the tracking subject has been lost sight of by the image tracking function, so that tracking does not continue while mistakenly identifying some other photographic subject 52 as being the subject for tracking. Furthermore, even if the situation is not such as shown in FIG. 5, driving of the photographic image is temporarily prohibited (the lock on mode) when the reliability of the result of image tracking is low, in other words when the degree of resemblance with the template image is low, so that continuing tracking while taking an unreliable photographic subject as the subject for tracking is avoided. Thus, when the lock on setting member is set to strong, locking on is performed at high intensity.

In a step S11 of the FIG. 8 flow chart, after focus adjustment area selection and lens driving, a decision is made as to whether or not a condition for updating of the template image 48 currently holds. In this embodiment, it is supposed that whether or not the user set AF area and the photographic subject tracking region 47 that is the result of image tracking (refer to the step S8 of the FIG. 8 flow chart) are close together, in other words the fact that these two regions are in a positional relationship less than or equal to a predetermined distance apart for which it is considered that the tracking subject in the user set AF region is being acquired, is taken as the template updating condition. If the template updating condition holds, then the flow of control proceeds to a step S12, and, as described above, the color information RG[x,y], BG[x,y] and the luminance information L[x,y] of the photographic subject tracking region 47 that is the result of image tracking are stored in the memory 19d as the color information RGref[x,y], BGref[x,y] and the luminance information Lref[x,y] of the template image 48. Thereafter the flow of control returns to the step S6 and the processing described above is repeated.

In this manner, according to this embodiment, with a photographic subject tracking device that is endowed with an AF tracking function of detecting the position of a tracking subject within a photographic scene based upon the defocus amounts of a photographic lens detected in a plurality of focus detection areas that are set within the photographic scene, and with an image tracking function of detecting the position of the tracking subject within a photographic scene based upon an image that is captured by the photographic lens and upon a template image, it is arranged to set the relative amounts of contribution of the AF tracking result and the image tracking result, when determining the position of the tracking subject, in other words of the focus adjustment area, according to the degree of temporary prohibition of focus adjustment, in other words according to the set lock on intensity, that has been set with a lock on setting member, and to perform focus adjustment of the photographic lens based upon the defocus amount of the focus adjustment area. Due to this, it is possible to use the AF tracking function and the image tracking function appropriately in accordance with the photographic scene, so that it is possible to track the photographic subject that the photographer intends.

To put it in another manner, the focus detection position for the photographic subject that the photographer intends may be selected appropriately according to the setting for the degree of prohibition of focus adjustment. It should be understood that it would also be acceptable to term this image tracking function a "color tracking function".

Moreover, according to this embodiment, if the level of contribution of the AF tracking result has been set to high by the lock on setting member, in other words if the lock on intensity strength is set to "none" or to "weak", then it is arranged to determine the position of the tracking subject, in other words the focus adjustment area, while giving priority to the defocus amount of the user set AF area. Due to this, in a case such as when performing photography of a sport such as soccer in which the player who has the ball changes over repeatedly, it is possible to acquire these players sequentially in the user set AF area while changing them over appropriately as desired.

Furthermore, according to this embodiment, if the level of contribution of the image tracking result has been set to high by the lock on setting member, in other words if the lock on intensity strength is set to "strong", then it is arranged to determine the position of the tracking subject, in other words the focus adjustment area, while giving priority to the defocus amount of the focus detection area that corresponds to the photographic subject region tracked by the image tracking function. Due to this, with a photographic scene in which the same photographic subject is continually being followed, it is possible to prevent undesirable changing over of the tracking subject to another photographic subject that is mistakenly acquired, and it is possible to continue tracking the photographic subject that the photographer intends.

And, according to this embodiment, if the level of contribution of the image tracking result is set to high by the lock on setting member, and moreover the minimum difference minDiff between the color information of the tracking photographic subject region that is the result of image tracking and the color information of the template is greater than the predetermined value so that the degree of resemblance is low, then it is arranged temporarily to prohibit driving of the photographic lens and to apply the lock on state. Due to this, it is possible to prevent tracking from being continued while taking a photographic subject for which the image tracking result is of low reliability as being the subject for tracking.

Yet further, according to this embodiment, if the level of contribution of the image tracking result is set to high by the lock on setting member, and moreover no focus detection area exists that corresponds to the tracking photographic subject region that is the result of image tracking, then it is arranged temporarily to prohibit driving of the photographic lens and to apply the lock on state. Due to this, it is possible to prevent another photographic subject from being mistakenly acquired and the tracking subject from changing over to that other photographic subject, which would be undesirable, and it is possible to continue tracking the photographic subject that the photographer intends.

A Variant Embodiment

While, in the embodiment described above, an example was shown in which the focus adjustment area was selected according to the setting of the lock on setting member, now a variant embodiment will be explained in which updating of the template image is performed according to the setting of the lock on setting member. It should be understood that, since the physical structure of this variant embodiment is the same as that shown in FIGS. 1 and 2 and described above, explanation thereof will be curtailed.

Figure 14:
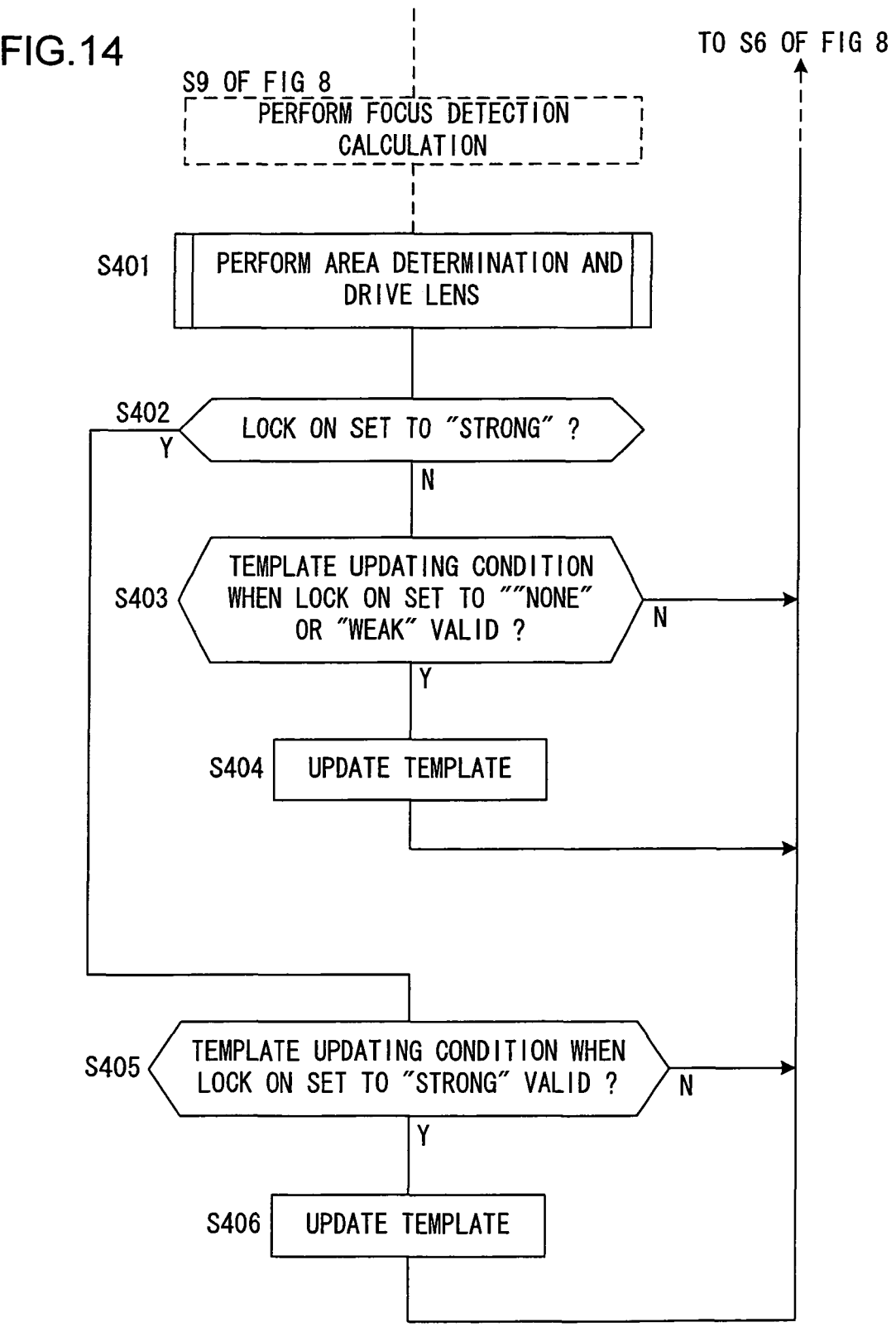
FIG. 14 is a flow chart showing tracking control according to a variant embodiment.
Figure 15:
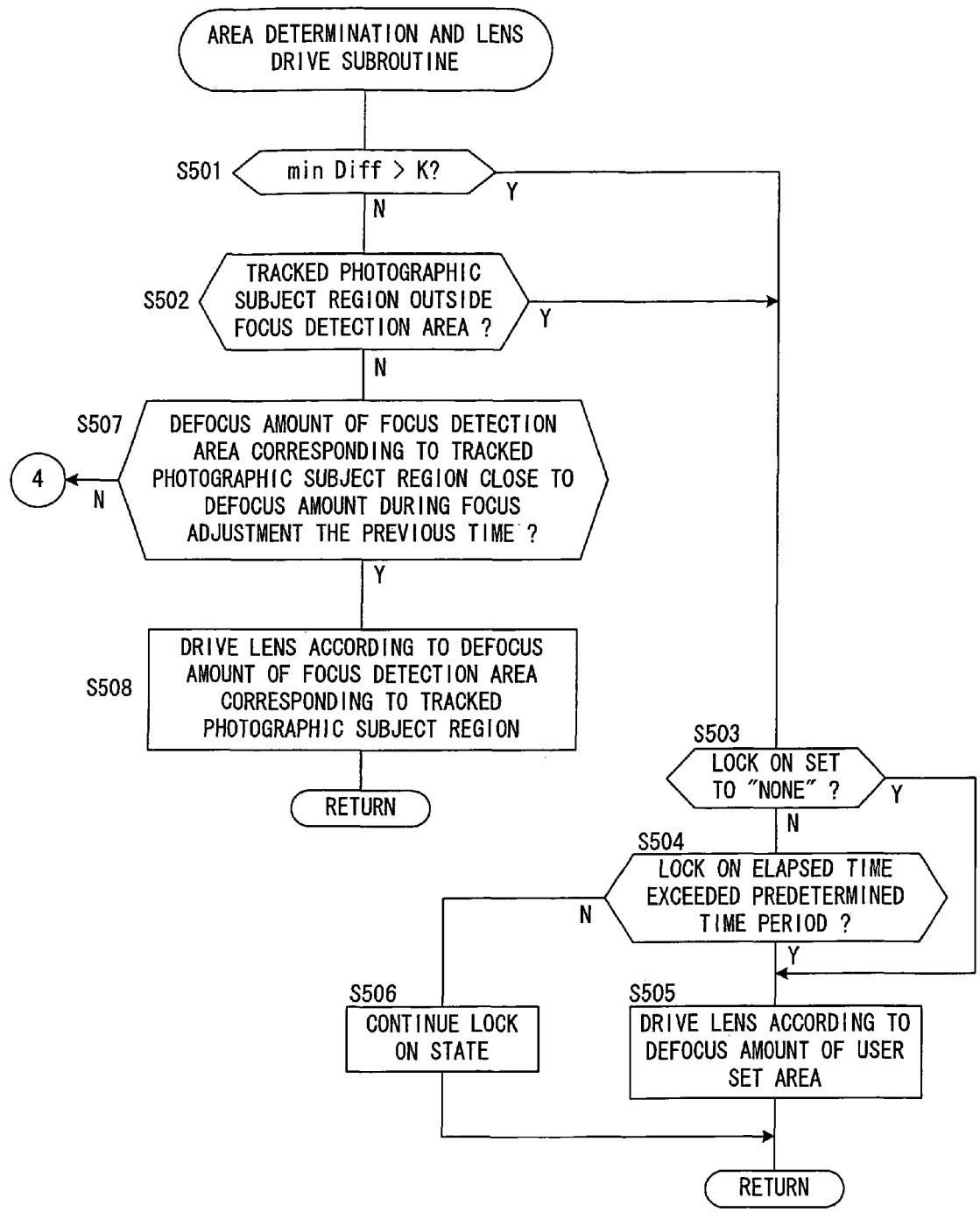
FIG. 15 is a flow chart showing an area determination lens drive routine of the variant embodiment.
Figure 16:
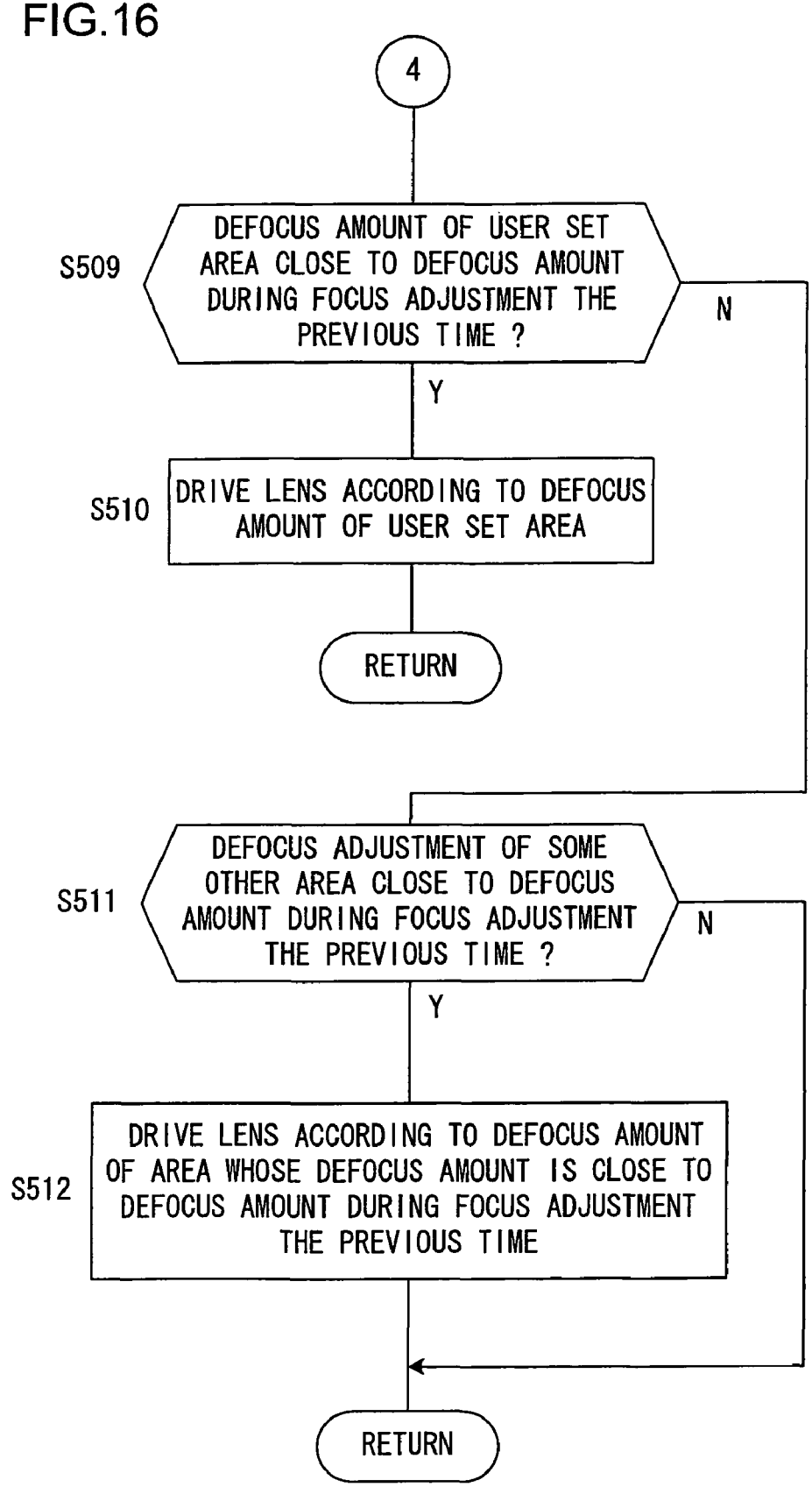
FIG. 16 is a flow chart continuing on from FIG. 15, further showing this area determination lens drive routine according to the variant embodiment.

FIG. 14 is a flow chart showing the photographic subject tracking control. It should be understood that the processing of the steps S1 through S9 is the same as the processing of the steps S1 through S9 shown in the FIG. 8 flow chart, and accordingly explanation thereof will here be curtailed. After having performed the focus detection calculation of the step S9 and having detected the defocus amounts of the focus detection areas 45a through 45g, in a step S401, an area determination lens drive routine shown in FIGS. 15 and 16 is executed. It should be understood that it would also be acceptable, in this step S401, to execute the area determination lens drive routine of the first embodiment shown in FIGS. 11 through 13.

In a step S501 of the FIG. 15 flow chart, a decision is made as to whether or not the degree of resemblance between the color information for the tracking photographic subject region 47 this time and the color information of the template image 48 is low. In other words, if the minimum value minDiff of the difference Diff with the color information of the above described template image 48 is greater than a resemblance decision threshold value K that is set in advance, so that the degree of resemblance between them is low, then the flow of control proceeds to a step S503. On the other hand, if this minimum difference minDiff is less than or equal to the threshold value K so that the degree of resemblance between them is high, then the flow of control proceeds to a step S502, in which it is determined whether or not the tracking photographic subject region 47 is outside the focus determination area. If no focus detection area exists that corresponds to the tracking photographic subject region 47, then the flow of control proceeds to the step S503, while if a focus detection area exists that corresponds to the tracking photographic subject region 47, then the flow of control proceeds to a step S507.

If the color information of the tracking photographic subject region 47 this time does not resemble the color information of the template image 48, or if no focus detection area exists that corresponds to the tracking photographic subject region 47 this time, then in the step S503 a decision is made as to whether or not the lock on setting member of the actuation members 20 is set to "none". If it is indeed set to "none" then the flow of control is transferred to a step S505, and the defocus amount that has been detected this time in the user set AF area is converted into a lens drive amount, and the focusing lens 8b is driven by the lens drive control device 22 according to this lens drive amount, so that focus adjustment is performed.

On the other hand, if the lock on setting member is set to "weak" or to "strong", then the flow of control proceeds to a step S504, in which a decision is made as to whether or not the elapsed time from when lock on was started, i.e. from when driving of the photographic lens 8 was temporarily prohibited, has exceeded a predetermined time period that is set in advance. If the elapsed time of lock on has exceeded the predetermined time period, then the flow of control proceeds to the step S505, the lock on is cancelled, the defocus amount that has been detected this time in the user set AF area is converted into a lens drive amount, and the focusing lens 8b is driven by the lens drive control device 22 according to this lens drive amount, so that focus adjustment is performed. On the other hand, if the lock on elapsed time has not yet reached the predetermined time period, then the flow of control proceeds to a step S506 and the lock on state is continued.

On the other hand, if the color information of the tracking photographic subject region 47 this time resembles the color information of the template image 48, and moreover a focus detection area does exist that corresponds to the tracking photographic subject region 47 this time, then in the step S507 a decision is made as to whether or not the defocus amount of the focus detection area that corresponds to the tracking photographic subject region 47 is close to the defocus amount of the focus detection area that was employed as the focus adjustment area during the previous episode of focus adjustment, in other words as to whether or not the difference between these two is less than or equal to the decision threshold value described above. It should be understood that, if a plurality of focus detection areas that correspond to the tracking photographic subject region 47 exist, then that focus detection area is selected for which the difference between the defocus amounts is minimum. If there is a defocus amount for which the difference is less than or equal to the decision threshold value, then the flow of control proceeds to a step S508, this defocus amount is converted into a lens drive amount, and the focusing lens 8b is driven by the lens drive control device 22 according to this lens drive amount, so that focus adjustment is performed.

On the other hand, if there is no defocus amount among the defocus amounts of the focus detection areas that correspond to the tracking photographic subject region 47 for which the difference is less than or equal to the decision threshold value, then the flow of control is transferred to the step S509 of the FIG. 16 flow chart, and a decision is made as to whether or not the defocus amount in the user set AF area that has been detected this time is close to the defocus amount of the focus detection area that was employed as the focus adjustment area during focus adjustment the previous time. If the difference between the two of them is less than a decision threshold value that is set in advance for considering them as being the same photographic subject, then the flow of control proceeds to a step S510, the defocus amount in the user set AF area that has been detected this time is converted into a lens drive amount, and the focusing lens 8b is driven by the lens drive control device 22 according to this lens drive amount, so that focus adjustment is performed.

On the other hand, if in the step S509 it has been decided that the difference between the defocus amount for the user set AF area and its defocus amount during focus adjustment the previous time is greater than the above described decision threshold value, then the flow of control is transferred to a step S511, in which a decision is made as to whether or not, among the defocus amounts that have been detected this time for the focus detection areas other than the user set AF area, there is one for which the defocus amount is close to the defocus amount of the focus detection area that was employed as the focus adjustment area during focus adjustment the previous time, in other words as to whether or not there is one for which the difference between the two of them is less than or equal to the above described decision threshold value. If there is a defocus amount for which the difference is less than or equal to the decision threshold value, then it is decided that the photographic subject in this focus detection area is the same as the photographic subject that was being tracked during the previous episode of focus adjustment, and the flow of control proceeds to a step S512, in which this defocus amount is converted into a lens drive amount, and the focusing lens 8b is driven by the lens drive control device 22 according to this lens drive amount, so that focus adjustment is performed.

If, among both the user set AF area and the other focus detection areas, there is none for which the defocus amount is close to the defocus amount of the focus detection area that was employed as the focus adjustment area during focus adjustment the previous time, then the flow of control returns to the step S402 of the FIG. 14 flow chart.

After the focus adjustment area selection and lens driving, in the step S402 of the FIG. 14 flow chart, a decision is made as to whether or not the lock on setting member of the actuation members 20 is set to "strong". If it is set to "strong" then the flow of control proceeds to a step S405, while if it is set to "none" or to "weak" then the flow of control proceeds to a step S403.

If the lock on setting member is set to "none" or to "weak", then a decision is made in the step S403 as to whether or not an updating condition for the template image 48 for the cases of "none" or "weak" is satisfied. In this embodiment, as this template updating condition for the "none" or "weak" cases, it is supposed that the user set AF area and the photographic subject tracking region 47 that is the result of image tracking (refer to the step S8 of the FIG. 8 flow chart) are close together, in other words that these two regions are in a positional relationship of being closer together than a predetermined distance for considering that the tracking subject in the user set AF area is being acquired; and moreover which the difference between the defocus amount in the user set AF area that has been detected this time and the defocus amount in the focus detection area that was employed as the focus adjustment area during the last episode of focus adjustment is less than or equal to a decision threshold value for considering them as relating to the same photographic subject, that is set in advance.

If the template updating condition for when the lock on setting member is set to "none" or to "weak" holds, then the flow of control proceeds to a step S404, and, as described above, the color information RG[x,y], BG[x,y] and the luminance information L[x,y] for the photographic subject tracking region 47 that is the result of image tracking are stored in the memory 19$d$ as the color information RGref [x, y], BGref [x,y] and the luminance information Lref[x,y] of the template image 48. On the other hand, if the template updating condition for when the lock on setting member is set to "none" or to "weak" does not hold, then the template image in the memory 19$d$ is not updated.

On the other hand, if the lock on setting member is set to "strong", then in the step S405 a decision is made as to whether or not a template updating condition for the template image 48 for the "strong" case is satisfied. In this embodiment, as this template updating condition for the "strong" case, it is supposed that the above described template updating condition for the "none" or "weak" case has held successively for a predetermined number of times. If the template updating condition for the "strong" case holds, then the flow of control proceeds to a step S406, and the color information RG[x,y], BG[x,y] and the luminance information L[x,y] for the photographic subject tracking region 47 are stored in the memory 19$d$ as the color information RGref [x, y], BGref[x, y] and the luminance information Lref[x,y] of the template image 48. On the other hand, if the template updating condition for the "strong" case does not hold, then the template image in the memory 19$d$ is not updated.

In this variant embodiment, by varying the ease of performing updating of the template image according to the value ("none", "weak", or "strong") that the user has set with the lock on setting member of the actuation members 20, it is possible to obtain the same advantageous effect as in the first embodiment described above, in other words it is possible to vary the degree of consideration that is accorded to the AF tracking result and to the image tracking result, so that it is possible to perform photographic subject tracking control that is well adapted to a photographic scene in which the "intensity" with that the tracking of the photographic subject that the user intends to be tracked continually varies.

Moreover, in this variant embodiment, it is made to be easier to update the template image when "none" or "weak" has been set with the lock on setting member, than when "strong" has been set. In other words, the frequency of updating of the template image is higher when "none" or "weak" has been set with the lock on setting member, than when "strong" has been set. Since tracking is performed while using the newest information and with the older information being discarded, as a result, setting the update frequency to high is equivalent to selecting the AF tracking function in the first embodiment. Conversely, setting the update frequency to low is equivalent to selecting the image tracking function in the first embodiment, since tracking is performed based upon older template image information.

Another Variant Embodiment

Although, in the embodiment shown above, an example has been shown in which the degree of consideration to be accorded to the AF tracking result in the image tracking result is set based upon a value ("none", "weak", or "strong") that the user has set with the lock on setting member of the actuation members 20, in another variant embodiment, it would also be acceptable to arrange to vary the value that the user sets with the lock on setting member, or the default value for the lock on setting that is stored in advance in the memory 19$d$, according to the degree of change of the color information and/or the luminance information of the AF area that has been selected. For example, if the color information or the luminance information of the user set AF area changes more frequently, it is decided that this is a photographic scene in which the user is changing the tracking subject, and it is automatically changed to the case in which the degree of consideration of the image tracking result becomes less compared with the AF tracking result when the lock on setting value is "none" or "weak"; and, conversely, if the color information or the luminance information of the user set AF area changes less frequently, it is decided that this is a photographic scene in which the user is continuously tracking the same subject, and it is automatically changed to the case in which the degree of consideration of the image tracking result becomes more compared with the AF tracking result when the lock on setting value is "strong". The frequency of changing is determined by deciding how often within a fixed time period the change of the color information or the luminance information has exceeded a predetermined value.

In this manner, by changing the lock on set value according to the frequency of change of the color information and/or the luminance information in the user set AF area, it is possible to perform photographic subject tracking control adapted to a photographic scene in which the "intensity" of continuous tracking of the photographic subject intended by the user is changed automatically.

It should be understood that although, in the embodiment described above, an example has been shown in which the lock on intensity is set in the three stages "none", "weak", and "strong" with the lock on setting member of the actuation members 20, it would also be acceptable to arrange for it to be possible to set the lock on intensity in two stages, or in four or more stages, or in a stepless manner.

Moreover although, in the embodiment described above, an example was shown in which the defocus amounts that were detected in the various focus detection areas and the defocus amount that was detected in the focus adjustment area used during the previous episode of focus adjustment were compared together, and the tracking subject was searched for in the photographic image, it would also be acceptable, if it is decided based upon the history of detection of its defocus amount that the photographic subject in question is shifting along the direction of the optical axis of the photographic lens, to arrange to forecast shifting of the photographic subject in question from the history of detection of its defocus amount, and to drive the photographic lens based upon the forecast result. Moreover, when selecting the focus adjustment area as well, it would also be acceptable, not to search for an area whose defocus amount is close to the defocus amount of the focus detection area that was employed as the focus adjustment area during the previous episode of focus adjustment, but rather to select, as the focus adjustment area, a focus detection area that has a defocusing amount close to the predicted position of the photographic subject.

The above described embodiments are examples, and various modifications can be made without departing from the scope of the invention.

What is claimed is:

1. A tracking device that tracks an object in an image field of an optical system, comprising:
   a focus detection unit that repeatedly detects focus adjustment states of the optical system at a plurality of focus detection positions that are set within the image field of the optical system;
   a first tracking control unit that tracks the object based upon the focus adjustment states that are detected by the focus detection unit in the plurality of focus detection positions;
   an image-capturing unit that repeatedly captures an image formed by the optical system and outputs image information corresponding thereto;
   a second tracking control unit that tracks the object based upon the image information that is outputted by the image-capturing unit, and reference image information that has been set as a reference;
   a setting unit that sets a degree to which focus adjustment based upon a focus adjustment state detected by the focus detection unit is temporarily prohibited; and
   a control unit that selects one of the first tracking control unit and the second tracking control unit to be used for tracking the object, based upon the degree that has been set by the setting unit, wherein:
   the setting unit is capable of setting a plurality of degrees;
   the relatively stronger degree among the plurality of degrees has been set by the setting unit, the control unit gives more priority to the second tracking control unit to be selected; and
   the control unit prohibits focus adjustment while the tracking is being performed by the second tracking control unit.

2. A tracking device according to claim 1, wherein
   the control unit prohibits focus adjustment while the tracking is being performed by one of the first tracking control unit and the second tracking control unit that has been selected based upon the degree.

3. A tracking device according to claim 1, wherein
   the degree to which focus adjustment is prohibited is set according to a length of a time period over which the focus adjustment is prohibited, and the stronger is the degree to which the focus adjustment is prohibited, the longer is the time period over which the focus adjustment is prohibited.

4. A tracking device according to claim 1, further comprising:
   a reference image update unit that updates the reference image information based upon the image information that is repeatedly outputted, wherein
   the control unit lowers a frequency of updating of the reference image information by the reference image update unit when the second tracking control unit has been selected, as compared with when the first tracking control unit has been selected.

5. A tracking device according to claim 1, wherein
   the setting unit sets the degree of prohibition according to a degree of change of image information that corresponds to a focus detection position that has been selected.

6. An image-capturing device, comprising a tracking device according to claim 1.

7. A tracking device that tracks an object in an image field of an optical system, comprising:
   a focus detection unit that repeatedly detects focus adjustment states of the optical system at a plurality of focus detection positions that are set within the image field of the optical system;
   a first tracking control unit that tracks the object based upon the focus adjustment states that are detected by the focus detection unit in the plurality of focus detection positions;
   an image-capturing unit that repeatedly captures an image formed by the optical system and outputs image information corresponding thereto;
   a second tracking control unit that tracks the object based upon the image information that is outputted by the image-capturing unit, and reference image information that has been set as a reference;
   a setting unit that sets a degree to which focus adjustment based upon a focus adjustment state detected by the focus detection unit is temporarily prohibited;
   a control unit that selects one of the first tracking control unit and the second tracking control unit to be used for tracking the object, based upon the degree that has been set by the setting unit; and
   a focus adjustment unit that is capable of repeatedly performing focus adjustment of the optical system, and also temporarily prohibiting the focus adjustment, wherein
   the focus adjustment unit prohibits the focus adjustment, when the second tracking control unit is selected, and a degree of resemblance between the image information and the reference image information is less than or equal to a predetermined value.

8. A tracking device that tracks an object in an image field of an optical system, comprising:
   a focus detection unit that repeatedly detects focus adjustment states of the optical system at a plurality of focus detection positions that are set within the image field of the optical system;
   a first tracking control unit that tracks the object based upon the focus adjustment states that are detected by the focus detection unit in the plurality of focus detection positions;
   an image-capturing unit that repeatedly captures an image formed by the optical system and outputs image information corresponding thereto;
   a second tracking control unit that tracks the object based upon the image information that is outputted by the image-capturing unit, and reference image information that has been set as a reference;
   a setting unit that sets a degree to which focus adjustment based upon a focus adjustment state detected by the focus detection unit is temporarily prohibited;
   a control unit that selects one of the first tracking control unit and the second tracking control unit to be used for tracking the object, based upon the degree that has been set by the setting unit; and
   a focus adjustment unit that is capable of repeatedly performing focus adjustment of the optical system, and also temporarily prohibiting the focus adjustment, wherein the focus adjustment unit prohibits the focus adjustment, when the second tracking control unit is selected, and the second tracking control unit has become impossible to track the object.

9. A focus adjustment device, comprising:
a focus detection unit that repeatedly detects focus adjustment states of an optical system at a plurality of focus detection positions that are set within an image field of the optical system;
a first selection unit that selects any one of the plurality of focus detection positions, based upon the focus adjustment states;
an image-capturing unit that repeatedly captures an image formed by the optical system and outputs image information corresponding thereto;
a second selection unit that selects any one of the plurality of focus detection positions, based upon the image information and reference image information that has been set as a reference;
a focus adjustment unit that repeatedly performs focus adjustment of the optical system based upon a focus adjustment state that is repeatedly detected for a focus detection position that has been selected by either the first selection unit or the second selection unit, and also is capable of temporarily prohibiting the focus adjustment;
a setting unit that sets a degree to which the focus adjustment based upon a focus adjustment state detected by the focus detection unit is temporarily prohibited; and
a control unit that, when a focus position that is made a subject of the focus adjustment by the focus adjustment unit is selected, selects one of the first selection unit and the selection unit based upon the degree set by the setting unit, wherein:
the focus adjustment unit prohibits the focus adjustment based upon either change of the focus adjustment state detected at the focus detection position that has been selected by the first selection unit, or fluctuation of the focus detection position selected by the first selection unit or the second selection unit;
the setting unit is capable of setting a first degree of prohibition and a second degree of prohibition that have different sensitivities, with respect to at least one of the change of the focus adjustment state, and the fluctuation of the focus detection position; and
the control unit gives priority to the first selection unit to be selected over the second selection unit, if the first degree of prohibition is set, and gives priority to the second selection unit to be selected over the first selection unit, if the second degree of prohibition is set.

10. A focus adjustment device according to claim 9, further comprising:
a reference image update unit that updates the reference image information based upon the image information that is repeatedly outputted, wherein
the control unit lowers a frequency of updating of the reference image information by the reference image update unit when giving priority to the second selection unit is to be selected over the first selection unit, as compared with when giving priority to the first selection unit to be selected over the second selection unit.

11. A focus adjustment device according to claim 9, wherein
the setting unit sets the degree of prohibition according to the degree of change of the image information corresponding to a focus detection position that has been selected.

12. An image capturing device, comprising a focus adjustment device according to claim 9.

13. A focus adjustment device, comprising:
a focus detection unit that repeatedly detects focus adjustment states of an optical system at a plurality of focus detection positions that are set within an image field of the optical system;
a first selection unit that selects any one of the plurality of focus detection positions, based upon the focus adjustment states;
an image-capturing unit that repeatedly captures an image formed by the optical system and outputs image information corresponding thereto;
a second selection unit that selects any one of the plurality of focus detection positions, based upon the image information and reference image information that has been set as a reference;
a focus adjustment unit that repeatedly performs focus adjustment of the optical system based upon a focus adjustment state that is repeatedly detected for a focus detection position that has been selected by either the first selection unit or the second selection unit, and also is capable of temporarily prohibiting the focus adjustment;
a setting unit that sets a degree to which the focus adjustment based upon a focus adjustment state detected by the focus detection unit is temporarily prohibited; and
a control unit that, when a focus position that is made a subject of the focus adjustment by the focus adjustment unit is selected, selects one of the first selection unit and the selection unit based upon the degree set by the setting unit,
wherein
the focus adjustment unit prohibits the focus adjustment, when the control unit gives priority to the second selection unit to be selected over the first selection unit, and a degree of resemblance between the image information and the reference image information is less than or equal to a predetermined value.

14. A focus adjustment device, comprising:
a focus detection unit that repeatedly detects focus adjustment states of an optical system at a plurality of focus detection positions that are set within an image field of the optical system;
a first selection unit that selects any one of the plurality of focus detection positions, based upon the focus adjustment states;
an image-capturing unit that repeatedly captures an image formed by the optical system and outputs image information corresponding thereto;
a second selection unit that selects any one of the plurality of focus detection positions, based upon the image information and reference image information that has been set as a reference;
a focus adjustment unit that repeatedly performs focus adjustment of the optical system based upon a focus adjustment state that is repeatedly detected for a focus detection position that has been selected by either the first selection unit or the second selection unit, and also is capable of temporarily prohibiting the focus adjustment;
a setting unit that sets a degree to which the focus adjustment based upon a focus adjustment state detected by the focus detection unit is temporarily prohibited; and
a control unit that, when a focus position that is made a subject of the focus adjustment by the focus adjustment unit is selected, selects one of the first selection unit and the selection unit based upon the degree set by the setting unit, wherein the focus adjustment unit prohibits the focus adjustment, when the control unit gives priority to the second selection unit to be selected over the first selection unit, and the focus detection position cannot be selected by the second selection unit.

15. A tracking method for tracking an object in an image field of an optical system, comprising:

repeatedly detecting focus adjustment states of an optical system at a plurality of focus detection positions that are set within the image field of the optical system;

repeatedly capturing an image formed by the optical system with an image-capturing unit, and outputting image information corresponding thereto;

setting a degree to which focus adjustment based upon a focus adjustment state is temporarily prohibited; and selecting, based upon the degree that has been set, one of a first tracking control method in which the object is tracked based upon the focus adjustment states that have been detected at the plurality of focus detection positions, and a second tracking control method in which the object is tracked based upon the image information that is outputted by the image-capturing unit and reference image information that has been set as reference, wherein:

a plurality of degrees can be set;

the relatively stronger degree among the plurality of degrees has been set, the more priority is given to the second tracking control method to be selected; and the focus adjustment is prohibited while tracking is being performed by the second tracking control method unit.

16. A tracking method according to claim 15, wherein the degree to which the focus adjustment is prohibited is set according to a length of a time period over which the focus adjustment is prohibited, and the stronger is the degree to which the focus adjustment is prohibited, the longer is the time period over which the focus adjustment is prohibited.

17. A tracking method according to claim 15, further comprising:

updating the reference image information based upon the image information that is repeatedly outputted, wherein a frequency of updating of the reference image information is lowered when the second tracking control method has been selected, as compared with when the first tracking control method has been selected.

18. A tracking method for tracking an object in an image field of an optical system, comprising:

repeatedly detecting focus adjustment states of an optical system at a plurality of focus detection positions that are set within the image field of the optical system;

repeatedly capturing an image formed by the optical system with an image-capturing unit, and outputting image information corresponding thereto;

setting a degree to which focus adjustment based upon a focus adjustment state is temporarily prohibited; and selecting, based upon the degree that has been set, one of a first tracking control method in which the object is tracked based upon the focus adjustment states that have been detected at the plurality of focus detection positions, and a second tracking control method in which the object is tracked based upon the image information that is outputted by the image-capturing unit and reference image information that has been set as a reference; and repeatedly performing focus adjustment of the optical system, wherein the focus adjustment is temporarily prohibited, when the second tracking control method is selected, and a degree of resemblance between the image information and the reference image information is less than or equal to a predetermined value.

19. A tracking method for tracking an object in an image field of an optical system, comprising:

repeatedly detecting focus adjustment states of an optical system at a plurality of focus detection positions that are set within the image field of the optical system;

repeatedly capturing an image formed by the optical system with an image-capturing unit, and outputting image information corresponding thereto;

setting a degree to which focus adjustment based upon a focus adjustment state is temporarily prohibited; and selecting, based upon the degree that has been set, one of a first tracking control method in which the object is tracked based upon the focus adjustment states that have been detected at the plurality of focus detection positions, and a second tracking control method in which the object is tracked based upon the image information that is outputted by the image-capturing unit and reference image information that has been set as a reference; and repeatedly performing focus adjustment of the optical system, wherein the focus adjustment is temporarily prohibited, when the second tracking control method is selected, and tracking by the second tracking control method has become impossible.

20. A tracking method for tracking an object in an image field of an optical system, comprising:

repeatedly detecting focus adjustment states of an optical system at a plurality of focus detection positions that are set within the image field of the optical system;

repeatedly capturing an image formed by the optical system with an image-capturing unit, and outputting image information corresponding thereto;

setting a degree to which focus adjustment based upon a focus adjustment state is temporarily prohibited; and selecting, based upon the degree that has been set, one of a first tracking control method in which the object is tracked based upon the focus adjustment states that have been detected at the plurality of focus detection positions, and a second tracking control method in which the object is tracked based upon the image information that is outputted by the image-capturing unit and reference image information that has been set as a reference, wherein the degree of prohibition is set according to a degree of change of the image information that corresponds to a focus detection position that has been selected.

21. An image-capturing device, comprising:

an image-capturing unit that captures an image formed by an optical system and outputs image information corresponding thereto;

a focus detection unit that detects focus adjustment states corresponding to a plurality of focus detection areas that are set within a photographic image field;

a focus adjustment control unit that performs focus adjustment control using focus adjustment states that are detected by the focus detection unit;

a first tracking unit that tracks a tracking object using the focus adjustment states that are detected by the focus detection unit;

a second tracking unit that tracks the tracking object using the image information that is outputted by the image-capturing unit;

a condition setting unit that sets a first condition or a second condition; and a tracking control unit that tracks the tracking object by weighting a tracking result by the second tracking unit more when the second condition is set by the condition setting unit than when the first condition is set by the condition setting unit, wherein:

the focus adjustment control unit performs focus adjustment control based upon a focus adjustment state of a focus detection area corresponding to a position of the tracking object that has been tracked by tracking control unit.

22. An image-capturing device according to claim 21, wherein:

the tracking control unit tracks the tracking object by using only a tracking result by the first tracking unit when the first condition is set by the condition setting unit, and tracks the tracking object by using the tracking result by the first tracking unit and the tracking result by the second tracking unit when the second condition is set by the condition setting unit.

23. An image-capturing device according to claim 21, wherein:

the focus adjustment control unit temporarily prohibits focus adjustment control when the tracking result by the second tracking unit is judged incorrect in case that the second condition is set by the condition setting unit, and does not prohibit focus adjustment control in case that the first condition is set by the condition setting unit.

24. An image-capturing device according to claim 23, wherein:

the condition setting unit is capable of setting a third condition that is different from the first condition and the second condition;

the tracking control unit tracks the tracking object by using only the tracking result by the first tracking unit when the third condition is set by the condition setting unit; and the focus adjustment control unit temporarily prohibits focus adjustment control when the tracking result by the second tracking unit is judged incorrect in case that the third condition is set by the condition setting unit.

25. An image-capturing device according to claim 24, wherein:

the focus adjustment control unit temporarily prohibits focus adjustment control for a first time period when the second condition is set by the condition setting unit, and temporarily prohibits focus adjustment control for a second time period shorter than the first time period when the third condition is set by the condition setting unit.

* * * * *